United States Patent
Sato

(10) Patent No.: US 10,244,043 B1
(45) Date of Patent: Mar. 26, 2019

(54) MANAGEMENT SYSTEM FOR A PLANT FACILITY AND METHOD FOR MANAGING A PLANT FACILITY

(71) Applicant: YOKOGAWA ELECTRIC CORPORATION, Tokyo (JP)

(72) Inventor: Atushi Sato, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/713,033

(22) Filed: Sep. 22, 2017

(51) Int. Cl.
- H04L 29/08 (2006.01)
- G05B 19/042 (2006.01)
- G06F 13/20 (2006.01)
- H04L 29/06 (2006.01)
- H04L 12/931 (2013.01)

(52) U.S. Cl.
CPC .......... H04L 67/10 (2013.01); G05B 19/0426 (2013.01); G06F 13/20 (2013.01); H04L 67/12 (2013.01); *H04L 29/06* (2013.01); *H04L 49/351* (2013.01)

(58) Field of Classification Search
None
See application file for complete search history.

(56) References Cited

U.S. PATENT DOCUMENTS

| 6,088,665 A * | 7/2000 | Burns ................ G05B 19/0426 702/188 |
| 9,912,737 B2 * | 3/2018 | Patin ...................... H04L 67/10 |
| 2006/0206866 A1 * | 9/2006 | Eldrige .................. G05B 15/02 717/122 |
| 2007/0005266 A1 * | 1/2007 | Blevins .................. G05B 17/02 702/22 |
| 2007/0142936 A1 * | 6/2007 | Denison ............. G05B 13/0275 700/29 |
| 2007/0168065 A1 * | 7/2007 | Nixon .................... G06F 9/4488 700/83 |
| 2011/0072506 A1 * | 3/2011 | Law ..................... H04L 63/0227 726/11 |
| 2014/0352813 A1 * | 12/2014 | Tharaldson ........ G05D 16/2093 137/505 |
| 2016/0065656 A1 * | 3/2016 | Patin ....................... H04L 67/10 709/201 |
| 2017/0366414 A1 * | 12/2017 | Hamilton .............. H04L 41/147 |
| 2018/0114414 A1 * | 4/2018 | Law ......................... G08B 5/22 |

FOREIGN PATENT DOCUMENTS

JP H06-242979 A 9/1994

* cited by examiner

*Primary Examiner* — Ramesh B Patel
(74) *Attorney, Agent, or Firm* — Osha Liang LLP

(57) ABSTRACT

A management system for a plant facility is disclosed. The system includes a first field device that measures a process value, a first control node that calculates a first control value based on the process value, a second field device that operates according to the first control value, and an application node that configures one or more parameters for calculating the first control value. The first control node compares the first control value with a second control value calculated by one of the first field device, a second control node, and the application node. When determining that the first and the second control value are identical, the first control node sets the first control value to the second field device.

20 Claims, 22 Drawing Sheets

PRIOR ART

MANAGEMENT SYSTEM FOR A PLANT FACILITY AND METHOD FOR MANAGING A PLANT FACILITY

BACKGROUND

The present invention generally relates to a management system for a plant facility and a method for managing the plant facility.

A plant or a factory (hereinafter collectively referred to as "plant") commonly utilizes a process automation system (PAS) to implement advanced automatic operations for controlling and managing various types of process data (e.g., pressure, temperature, flow quantity, etc.) in an industrial process.

In particular, the PAS for the plant that produces chemical, oil, or gas related products must meet high standards in terms of availability and reliability. The availability means the capability for the system to continue its operation regardless of occurrences of errors, and the reliability means the capability of detecting errors and stopping the system and/or switching to a backup system for the continuous operation without causing damages to the entire system. In such a production plant, malfunctioning of the PAS may cause not only great losses of materials and resources but severe accidents involving human lives. For example, the malfunctioning may occur when the system improperly output an abnormal value (i.e., a value that indicates an abnormal or invalid state or condition) to a controlled device (e.g., valve) because of an occurrence of an electrical noise. To prevent such malfunctioning and improve the system reliability, various kinds of schemes have been developed.

Recently, as the number of Input/Output (I/O) devices connected to the PAS increases, the importance of the reliability of the controller increases. As a solution to achieve the highly-reliable PAS, several PAS manufacturers or vendors have developed their own controllers for the PAS. One of the conventional solutions for highly-reliable controllers is shown in FIG. 1 (Japanese Laid-Open Patent Application H06-242979), which assures reliable data processing in the PAS by redundant configuration. This scheme, which is called "Pair and Spare" (P&SP), achieves high reliability by a redundant controller and a redundant network. Moreover, each of the controllers has two CPUs and a comparator that compares the values outputted from the two CPUs to detect a mismatch in the data calculation.

On the other hand, it is known that such controllers separately developed by different manufacturers tend to affect interoperability and scalability of the PAS. A plant facility owner or user faces difficulties in expanding or replacing the controllers because of its poor compatibility and high costs. Thus, another approach has also been considered to design the system under "an open architecture," meaning that the system purely consists of general-purpose or Commercial Off-The-Shelf (COTS) hardware and software. The U.S. Patent Application Publication No. 2016/0065656 proposes such an open architecture platform for the PAS. FIG. 1A of that publication shows a platform including servers, control nodes, and field devices (I/O devices). In such a platform, highly-portable and standardized applications, protocols, and application programming interfaces (APIs) are employed so that the user can develop their system without depending on specific manufacturers. The user can also enjoy the benefits of decreased cost, enhanced scalability, and easiness of updating the system.

However, the open platform approach has disadvantages. The arbitrary combination of hardware and software developed by various manufacturers affects the reliability of core components including the controller and the I/O device as well as the network connection thereof. It is difficult for a system developed under the open architecture to achieve the same level of reliability as the proprietary system developed by the specific manufacturer.

To secure a certain level of the reliability in such a system operating under the open architecture, it is being proposed to limit the total number of I/O devices to be connected to a single controller. In particular, a distributed control node (DCN) is defined for handling an input signal from or an output signal to an I/O device. In this configuration, an error caused in the DCN only affects the single loop consisting of the single input and the single output device, and thereby is prevented from propagating in other control loops.

SUMMARY

One or more embodiments of the invention provide a management system for a plant facility, comprising: a first field device that measures a process value; a first control node that calculates a first control value based on the process value; a second field device that operates according to the first control value; and an application node that configures one or more parameters for calculating the first control value; wherein the first control node compares the first control value with a second control value calculated by one of the first field device, a second control node, and the application node, and when determining that the first and the second control value are identical, the first control node sets the first control value to the second field device.

One or more embodiments of the invention provide a method for managing a plant facility, comprising: measuring a process value in a first field device; in a first control node, calculating a first control value for operating a second field device based on the measured process value and one or more parameters configured by an application node; in one of the first field device, the first control node, and the application node, calculating a second control value for operating the second field device; in the first control node, comparing the first control value with the second control value; and in the first control node, when the first and the second control value are identical, setting the first control value to the second field device.

Other aspects of the invention will be apparent from the following description and the appended claims.

DETAILED DESCRIPTION

Figure 1:
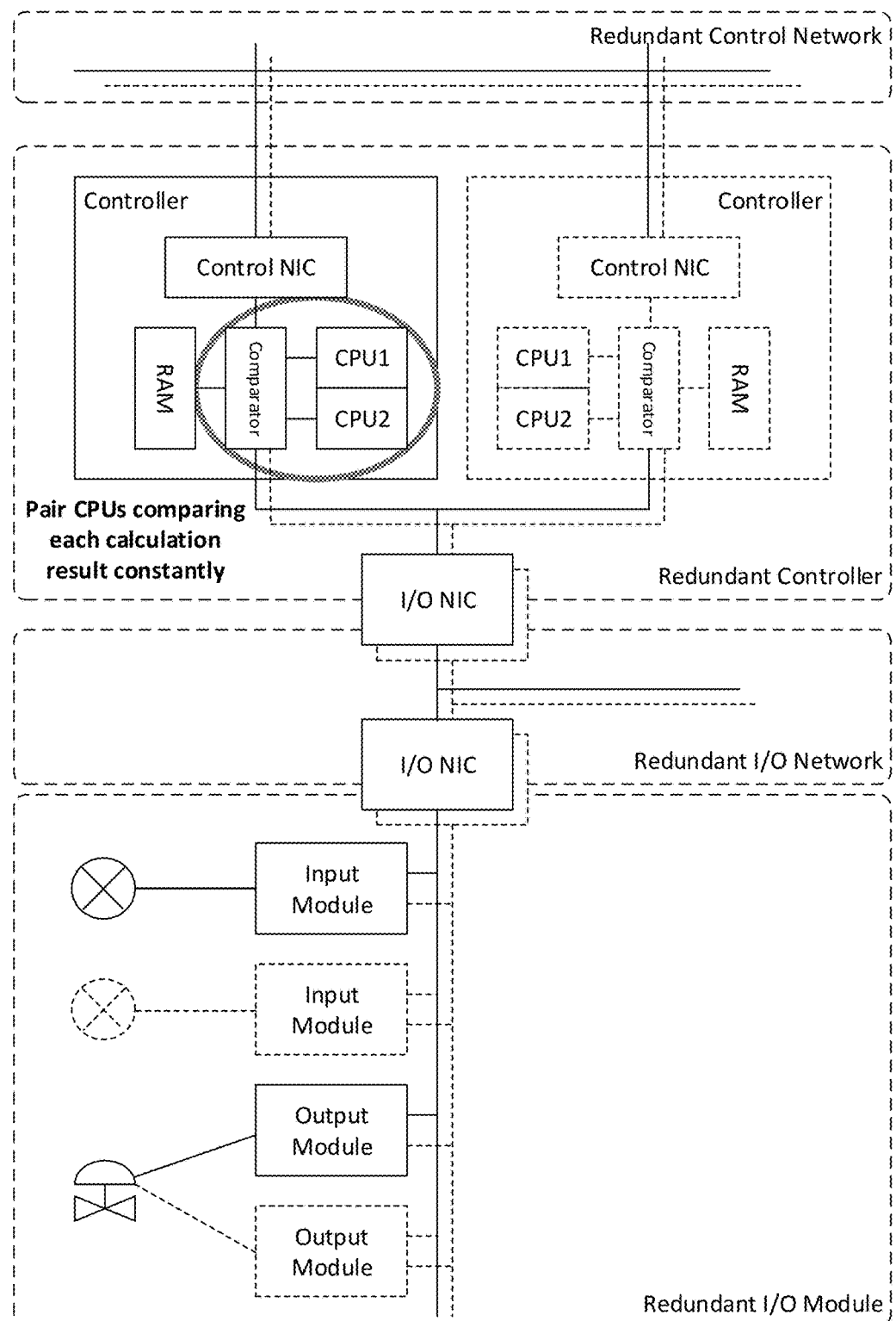
FIG. 1 shows a schematic view of a conventional PAS.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Under the open architecture, the DCN used in the PAS is limited to handle the minimum number of I/O signals, and thus its requirement level on reliability and availability is relatively lower than the conventional controller. However, critical processes still exist even in the open architecture PAS, which require high availability and reliability for the process data calculation and control. In such a system, one single error may seriously affect the entire control of a plant or other systems.

Under the open architecture platform, availability of the system may be improved by redundant configuration using general-purpose hardware and software. However, it is difficult to significantly improve reliability of the DCN and achieve the same level of reliability as the conventional system in terms of its cost, because the number of DCNs tends to be increased in proportion to the number of I/O devices connected to the system. Needless to say, the proprietary product designed by a specific manufacturer cannot be introduced to the open architecture system, even to improve its reliability.

One or more embodiments of the invention provide a system including the DCN that meets the requirements for the open architecture while achieving high reliability required by the critical process and keeping the cost lower than the conventional proprietary products. As a result, a user may design and implement its own PAS involving a mission-critical process control by means of general-purpose hardware and software provided by various manufacturers.

Figure 2:
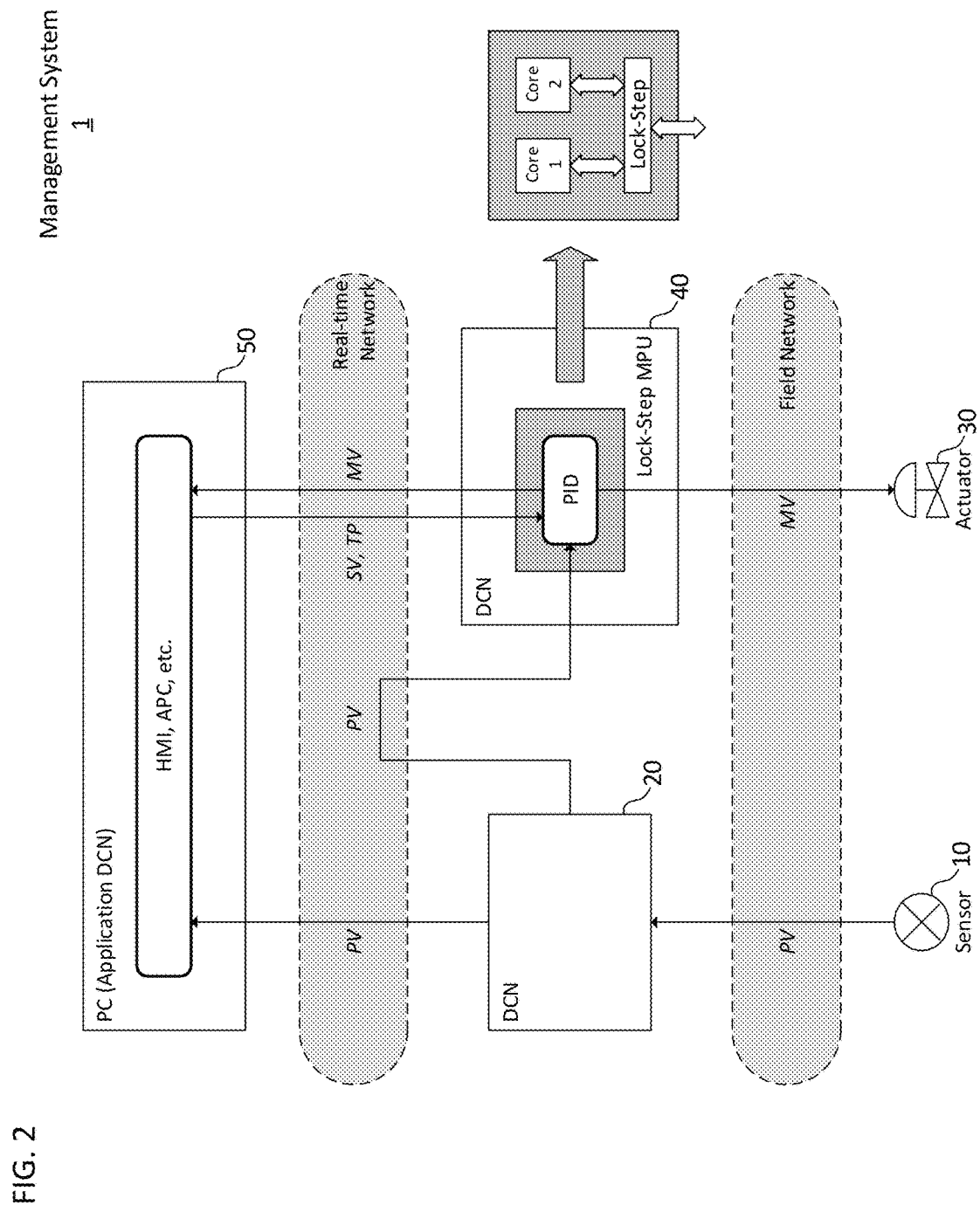
FIG. 2 shows a block diagram of the management system in accordance with one or more embodiments of the invention.

FIG. 2 shows a block diagram of a management system 1 in accordance with one or more embodiments of the invention. The management system 1 comprises a sensor 10, a DCN 20 that controls the sensor 10, an actuator 30, a DCN 40 that controls the actuator 30, and a PC 50 as an application DCN. The sensor 10 and the actuator 30 are each connected to the DCN 20 and the DCN 40 by a field network, such as HART and Foundation Fieldbus (FF), or by a 4-20 mA analog signal communication. The PC 50 is connected to the DCN 20 and the DCN 40 by a real-time network such as Ethernet. The DCN 20 and the DCN 40 may communicate with each other via the real-time network.

In one or more embodiments of the invention, the field network may be a wireless network such as Wireless HART or ISA100.11a. In one or more embodiments of the invention, the real-time network may be any type of network that supports a reliable clock synchronization function. The real-time network may have any type of network topology comprising a switch, a router or the equivalent.

The sensor 10 is an example of a first field device that is deployed in a plant facility and that measures a process value (PV) such as a temperature, an air pressure, a water pressure pleasure, and the like. The measured PV is transmitted to the DCN 20 or read out by the DCN 20 periodically.

The DCN 20 is an example of a single-point DCN, which receives a single PV from a single field device (e.g., the sensor 10). The DCN 20 transmits the PV to the DCN 40 and the PC 50 by the real-time network periodically. The transmission interval of the PV to the DCN 40 and the PC 50 may be different. In one or more embodiments of the invention, the transmission interval of the PV to the DCN 40 is shorter (e.g., 100 msec) than that of the PV to the PC 50 (e.g., 1 sec).

The actuator 30 is an example of a second field device that is deployed in the plant facility and that controls a control object such as a valve, a motor, a positioner, and the like. The actuator 30 controls the control objects according to a manipulation value (MV) or a control value, set by the DCN 40.

The DCN 40 is a single-point DCN on which a basic control application like a proportional-integral-differential control (PID) application works to calculate the MV based on the PV and one or more parameters set by the PC 50, such as a set value (SV) and a tuning parameter(s) (TP or TPs). The SV and the TP are configured by the PC 50 before the PID application calculates the MV. Once the MV is calculated properly (i.e., without errors), the DCN 40 sets the MV to the actuator 30 and transmits the MV to the PC 50. The timings of setting the MV to the actuator 30 and transmitting the MV to the PC 50 may be independent.

The PC 50 is an example of an application DCN that runs various applications including human-machine interface (HMI) and advanced process control (APC), which allow an operator to manually configure the SV and the TP and to show and monitor the calculated MV and errors transmitted from the DCN 40. The PC 50 may be any type of computer comprising a CPU and associated memory. In one or more embodiments of the invention, the PC 50 may be one or more general purpose computers or a system formed of distributed computers over a network.

In one or more embodiments of the invention, the DCN 40 comprises a lockstep microprocessor unit (MPU), which may execute the same operations at the same time with two processors (or two processor cores) in parallel and detect errors in such operations. In other words, the lockstep MPU may detect inconsistency in the operation by comparing the results calculated by the two processors. In one or more embodiments of the invention, the DCN 40 (the PID application) may cause each processor or core of the lockstep MPU to calculate the MV and detect an error in the MV calculation. When the error is not detected (i.e., the MV calculated in the two processors are identical), the DCN 40 sets the MV to the actuator 30. On the contrary, when the error is detected (i.e., the calculated MVs are not identical), the DCN 40 does not set the MV to the actuator 30. Instead, the DCN 40 reports an error to the PC 50. In this case, the actuator 30 continues to operate by using the current MV value.

Figure 3:
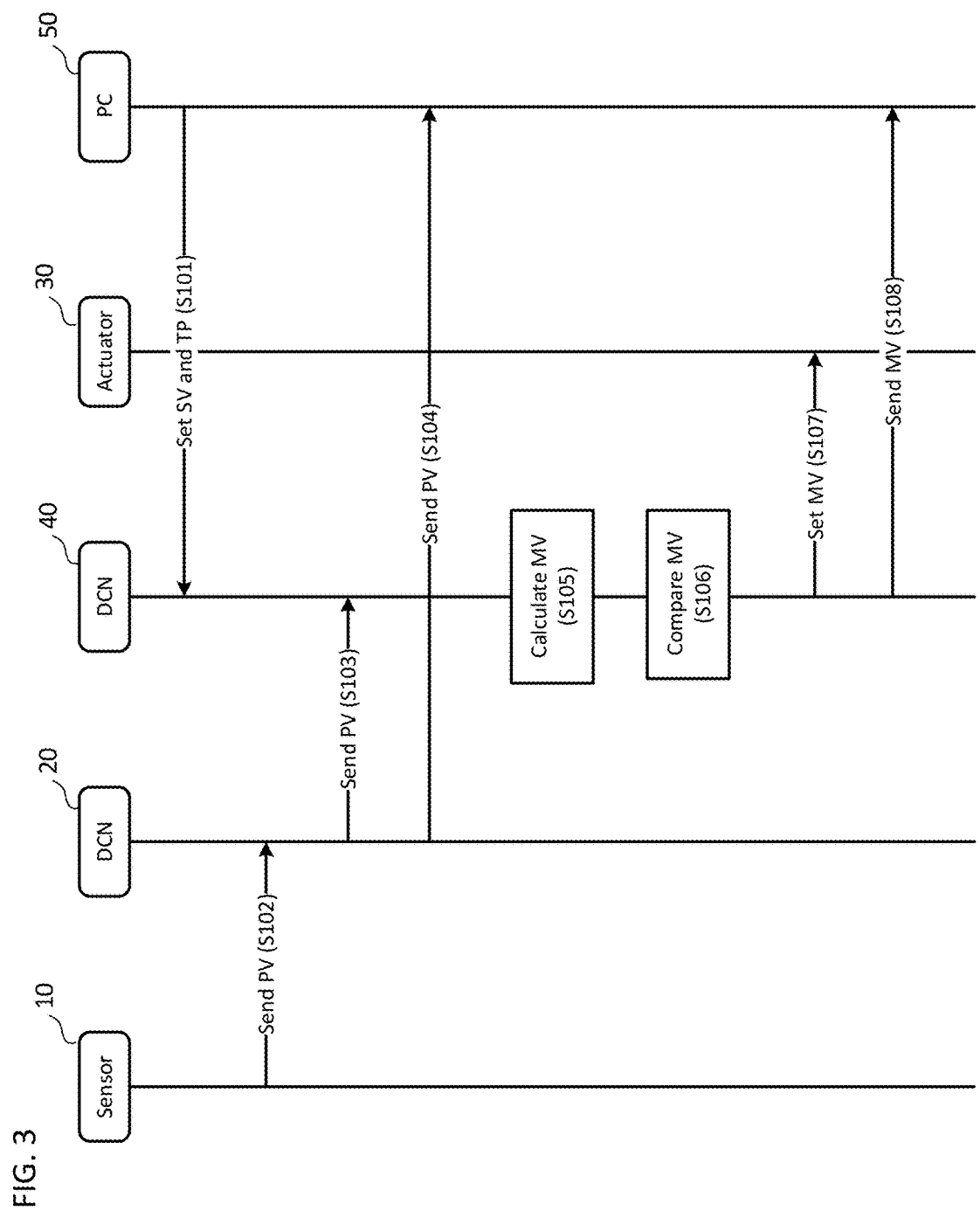
FIGS. 3-4 each show a sequence diagram of operations performed by the management system in accordance with one or more embodiments of the invention.

FIG. 3 shows a sequence diagram of operations performed by the management system 1 in accordance with one or more embodiments of the invention. FIG. 3 illustrates a scenario where the DCN 40 correctly sets a calculated MV to the actuator 30.

First, the PC 50 sets the SV and the TP to the DCN 40, which are used by the PID application for calculating the MV based on the PV (S101). This step may be performed at any time when the SV and the TP are required to be configured or updated. For example, the operator of the PC 50 may trigger the setting of the SV and the TP by the HMI.

Once the SV and the TP are configured, the sensor 10 measures a PV and sends the PV to the DCN 20 by the field network (S102). The transmission of the PV may be triggered by the DCN 20's reading action. When receiving the PV, the DCN 20 sends the PV to the DCN 40 (S103) and to the PC 50 (S104) by the real-time network. The transmissions of the PV to the DCN 40 and the PC 50 may be done independently. For example, the transmission of the PV from the DCN 20 to the DCN 40 may be automatically done in a certain interval or according to predetermined synchronization signals, and the transmission of the PV to the PC 50 may be done based on a request from the PC 50.

With the previously configured SV and TP and the received PV, the DCN 40 (the PID application) calculates a MV (S105). Here, the PID application is running on the lockstep MPU, and thus the DCN 40 (the lockstep MPU) may detect inconsistency of the MV calculation. In other words, the DCN 40 performs the MV calculation in parallel and compares the two calculated MVs (S106). When the two results are consistent (identical), the DCN 40 determines that the DCN 40 does not err in the MV calculation and sets the MV to the actuator 30 by the field network (S107). The DCN 40 also sends the calculated MV to the PC 50 by the real-time network (S108). The setting and transmission of the MV may be done independently. For example, the transmission of the MV to the PC 50 may be triggered by a request from the PC 50.

Figure 4:
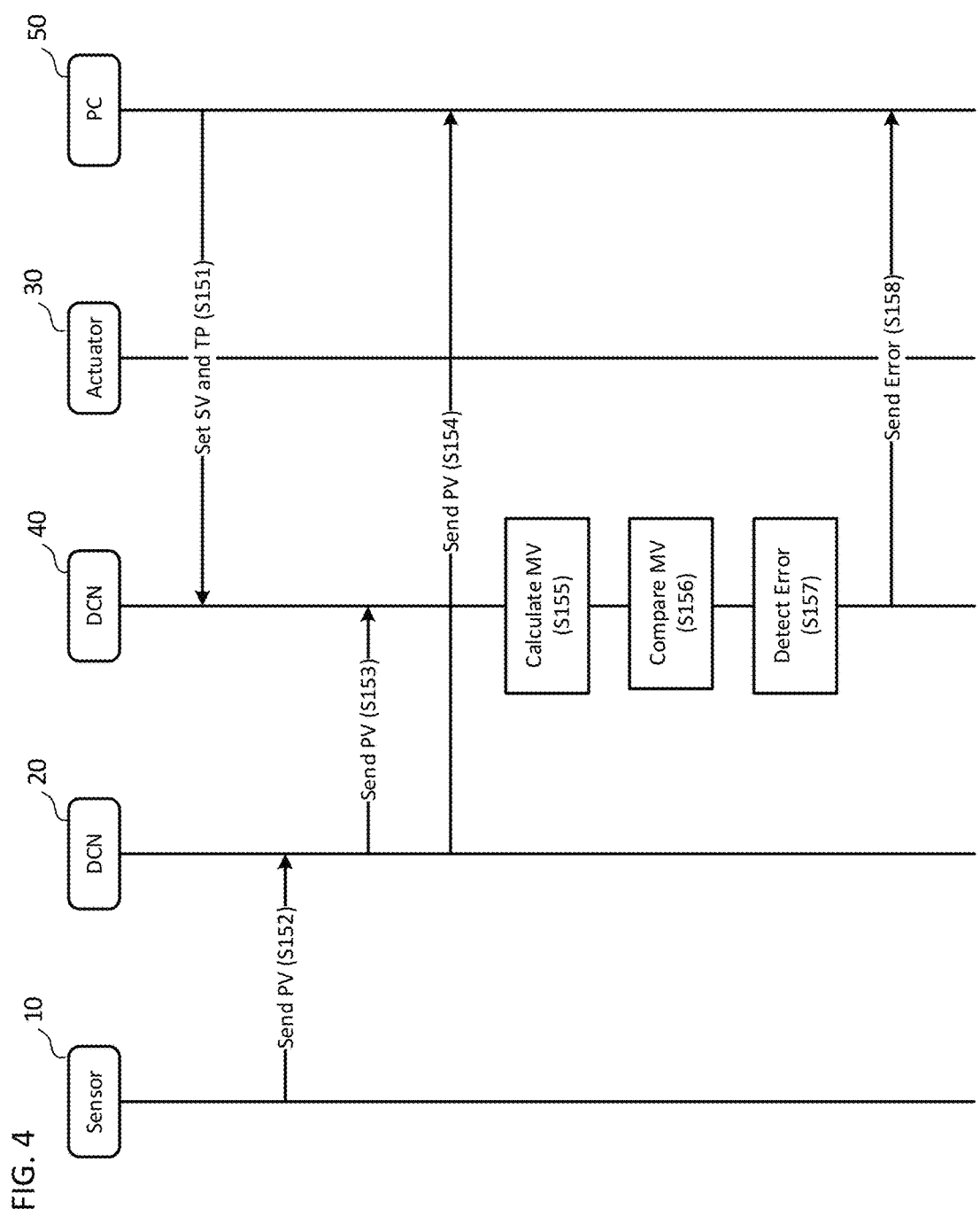

FIG. 4 shows a sequence diagram of operations performed by the management system 1 in accordance with one or more embodiments of the invention. FIG. 4 illustrates a scenario where the DCN 40 detects an error and avoids setting an abnormal value to the actuator 30.

Steps S151-S156 each correspond to S101-106 shown in FIG. 3.

At S157, when the two results are not consistent (not identical), the DCN 40 determines that the DCN 40 errs in the MV calculation and refrains from setting the calculated MV to the actuator 30. Instead, the DCN 40 sends an error to the PC 50 (S158) to inform the operator of the PC 50 of an occurrence of the error in the system.

According to one or more embodiments of the invention, even if some calculation error occurs in the DCN 40 because of a temporal electric noise, a potentially erroneous MV, which may seriously affect the entire control of the plant or other systems, is detected before it is sent to the actuator 30, and thereby serious accidents may be prevented.

According to one or more embodiments of the invention, only the DCN 40 connected to the actuator 30 is required to have the lockstep MPU, which contributes to cost reduction especially for the system to which thousands of field devices are connected. The lockstep MPU of the DCN 40 is a COTS product, and thus the management system 1 may still be designed without deviating from the concept of the open architecture.

Figure 5:
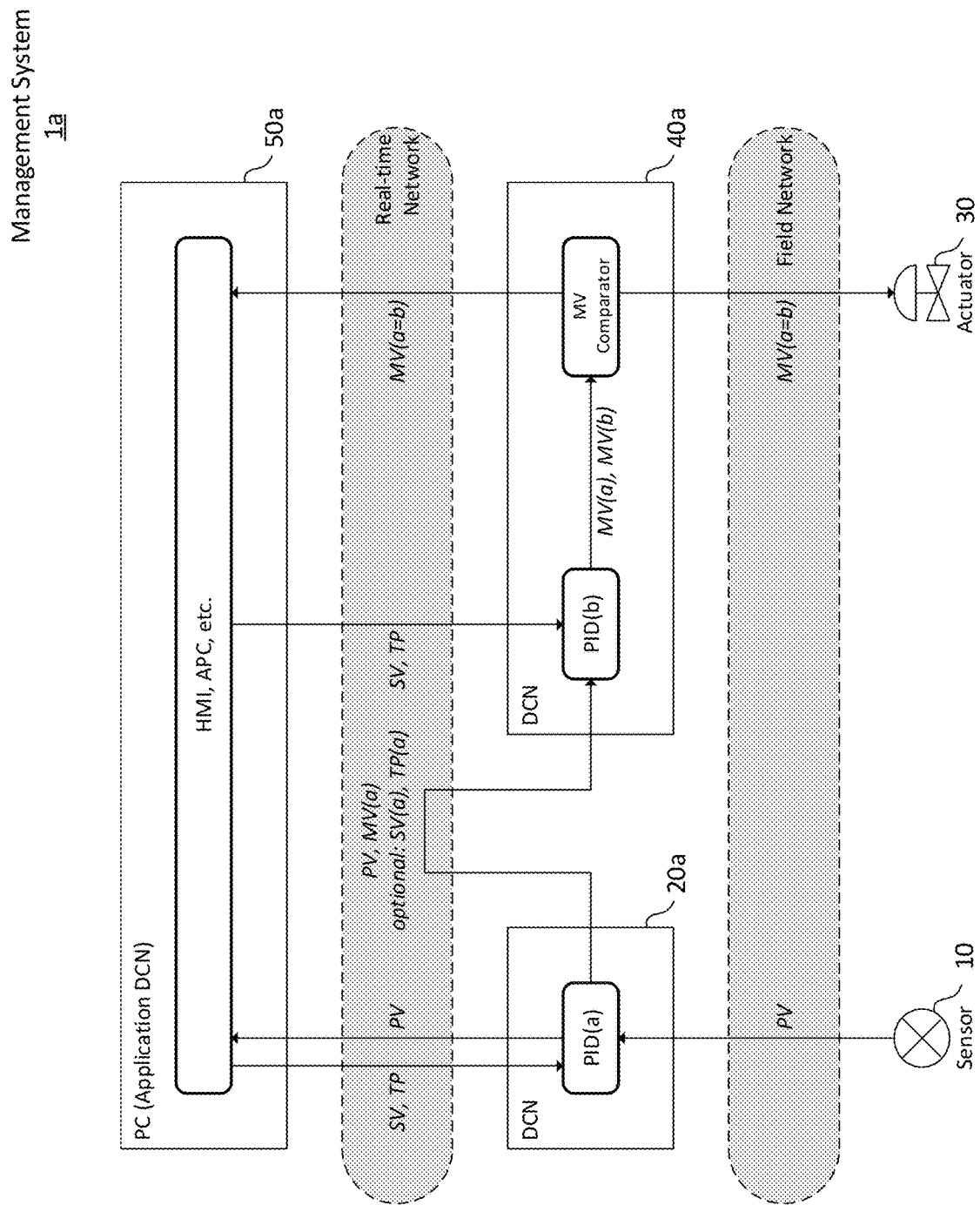
FIGS. 5-6 each show a block diagram of the management system in accordance with one or more embodiments of the invention.

FIG. 5 shows a block diagram of a management system 1*a* in accordance with one or more embodiments of the invention. The management system 1*a* comprises a sensor 10, a DCN 20*a* that controls the sensor 10, an actuator 30, a DCN 40*a* that controls the actuator 30, and a PC 50*a* as an application DCN. The sensor 10 and the actuator 30 are each connected to the DCN 20*a* and the DCN 40*a* by the field network, and the PC 50*a* is connected to the DCN 20*a* and the DCN 40*a* by the real-time network similarly to the example of FIG. 2. The DCN 20*a* and the DCN 40*a* may communicate with each other by the real-time network.

The DCN 20*a* receives or obtains a PV from the sensor 10 and may calculate a MV (hereinafter called "MV(a)") with a PID application running on the DCN 20*a*. To calculate the MV(a) in the DCN 20*a*, parameters SV and TP are set by the PC 50*a* in advance or at any time. The DCN 20*a* transmits the received PV to the PC 50*a* as well as the DCN 40*a*. Moreover, the DCN 20*a* transmits the calculated MV(a) to the DCN 40*a* for subsequent comparison operation. In one or more embodiments of the invention, the DCN 20*a* may transmit the SV and the TP that have been used to calculate the MV(a) (hereinafter called "SV(a)" and "TP(a)") to the DCN 40*a*. The SV(a) and TP(a) are used by the DCN 40*a* to verify that the same SV and TP are used for the MV calculation in the DCN 40*a*.

Figure 6:
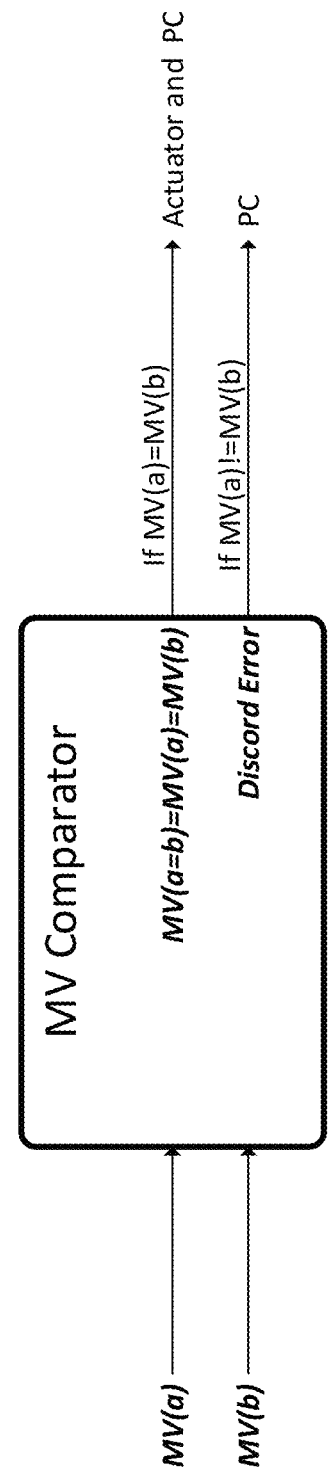

The DCN 40*a* of the management system 1*a* comprises a MV comparator that compares the MV(a) received from the DCN 20*a* with a MV(b), which is calculated by a PID application in the DCN 40*a* based on the PV received from the DCN 20*a*. The parameters SV and TP have been set by the PC 50*a* and are used for that calculation. As shown in FIG. 6, the MV comparator then reads the MV(a) and the MV(b) and outputs the MV(a) (or MV(b)) to the actuator 30 and PC 50*a* if the MV(a) and the MV(b) are "identical" i.e., both values are literally identical or the difference of the values is smaller than or equal to a predetermined value. On the other hand, if the MV(a) and the MV(b) are not identical or the difference of both values is greater than the predetermined value, the MV comparator reports an error to the PC 50*a*. Although not shown in FIG. 6, the MV comparator may report the error to other systems or DCNs. The MV comparator may be implemented by either hardware (i.e., circuitry embedded in the DCN 40*a*) or software (i.e., an application running on the DCN 40*a*).

In one or more embodiments of the invention, before calculating the MV(b), the PID application of the DCN 40*a* may verify that the SV and the TP configured by the PC 50*a* (i.e., SV(b) and TP(b)) are identical with the SV(a) and TP(a), respectively. This operation makes sure that the PID application in the DCN 20*a* and the PID application in the DCN 40*a* are configured with the same parameters.

In one or more embodiments of the invention, the DCN 40*a* may calculate the MV(b) solely based on the SV(a) and the TP(a) received from the DCN 20*a*. This configuration also prevents the PID application in the DCN 40*a* from calculating the MV(b) based on inconsistent parameters. In another embodiment of the invention, when determining that the SV and the TP configured by the PC 50*a* (i.e., SV(b) and TP(b)) are not identical with the SV(a) and TP(a), the PID application of the DCN 40*a* may calculate the MV(b) based solely on the SV(a) and the TP(a) received from the DCN 20*a*.

Figure 7:
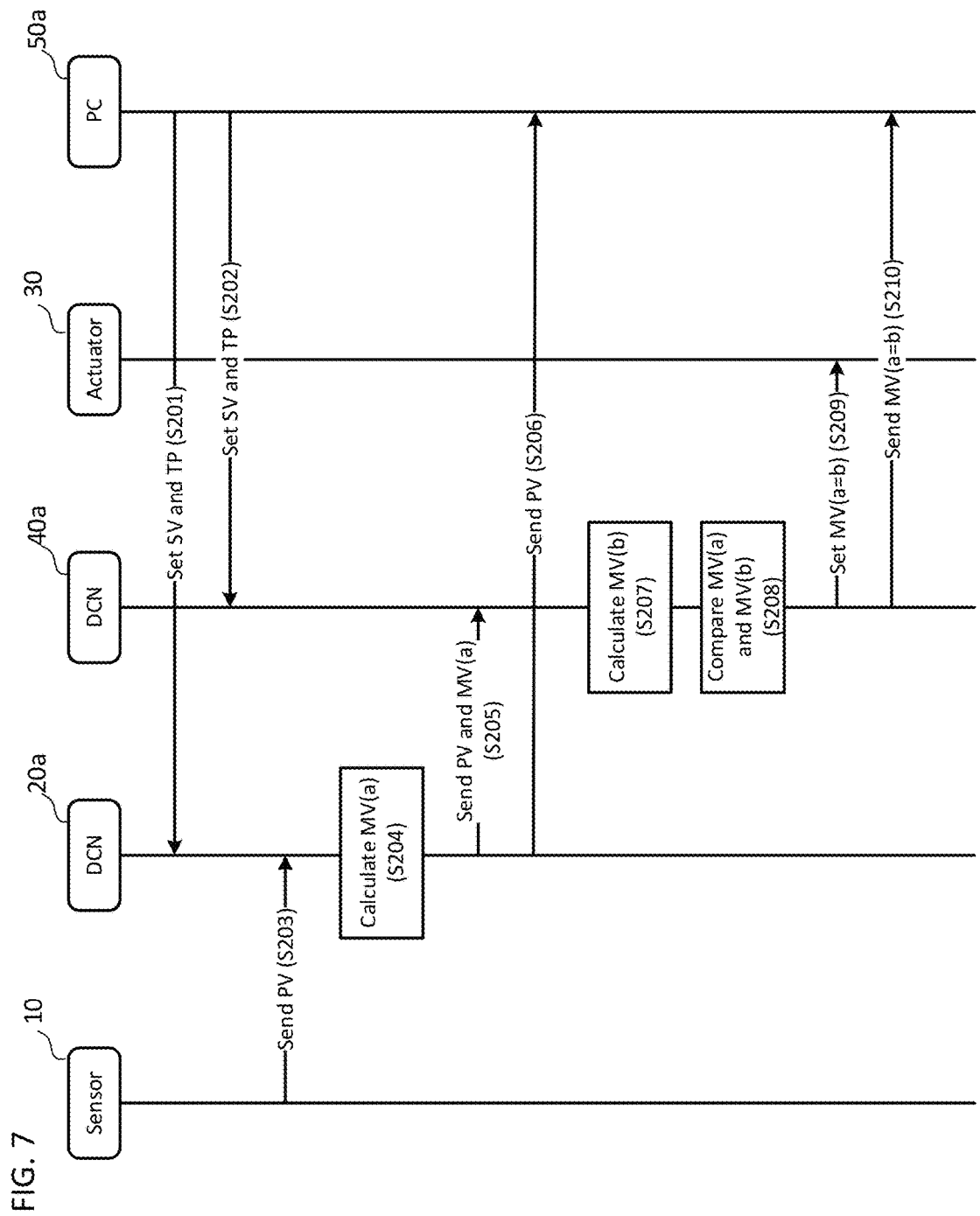
FIGS. 7-8 each show a sequence diagram of operations performed by the management system in accordance with one or more embodiments of the invention.

FIG. 7 shows a sequence diagram of operations performed by the management system 1*a* in accordance with one or more embodiments of the invention. FIG. 7 illustrates a scenario where the DCN 40*a* correctly sets a calculated MV to the actuator 30.

First, the PC 50*a* sets the SV and the TP to the DCN 20*a* and the DCN 40*a* (S201 and S202). These settings may be done at the same time by multicast transmission.

Next, the sensor 10 measures and sends the PV to the DCN 20*a* (S203). As discussed above, such transmission may be triggered by the DCN 20*a*'s reading action. The DCN 20*a* (the PID application) then calculates the MV(a) based on the received PV and the parameters SV(a) and TP(a) (S204) and sends the calculated MV(a) to the DCN 40*a* together with the PV (S205). The DCN 20*a* may also send the SV(a) and the TP(a) to the DCN 40*a* together with the MV(a) and PV. Further, the DCN 20*a* sends the PV to the PC 50*a* (S206).

Once receiving the PV and the MV(a), the DCN 40*a* (the PID application) calculates the MV(b) based on the received PV and the parameters SV(b) and TP(b) (S207). Then, the MV comparator of the DCN 40*a* compares the MV(a) received from the DCN 20*a* with the MV(b) calculated by the DCN 40*a* (S208). When the MV(a) and the MV(b) are identical, the MV comparator of the DCN 40*a* sets the MV(a) (or the MV(b)) to the actuator 30 (S209). Additionally, the DCN 40*a* sends the MV(a) (or the MV(b)) to the PC 50*a* (S210).

Figure 8:
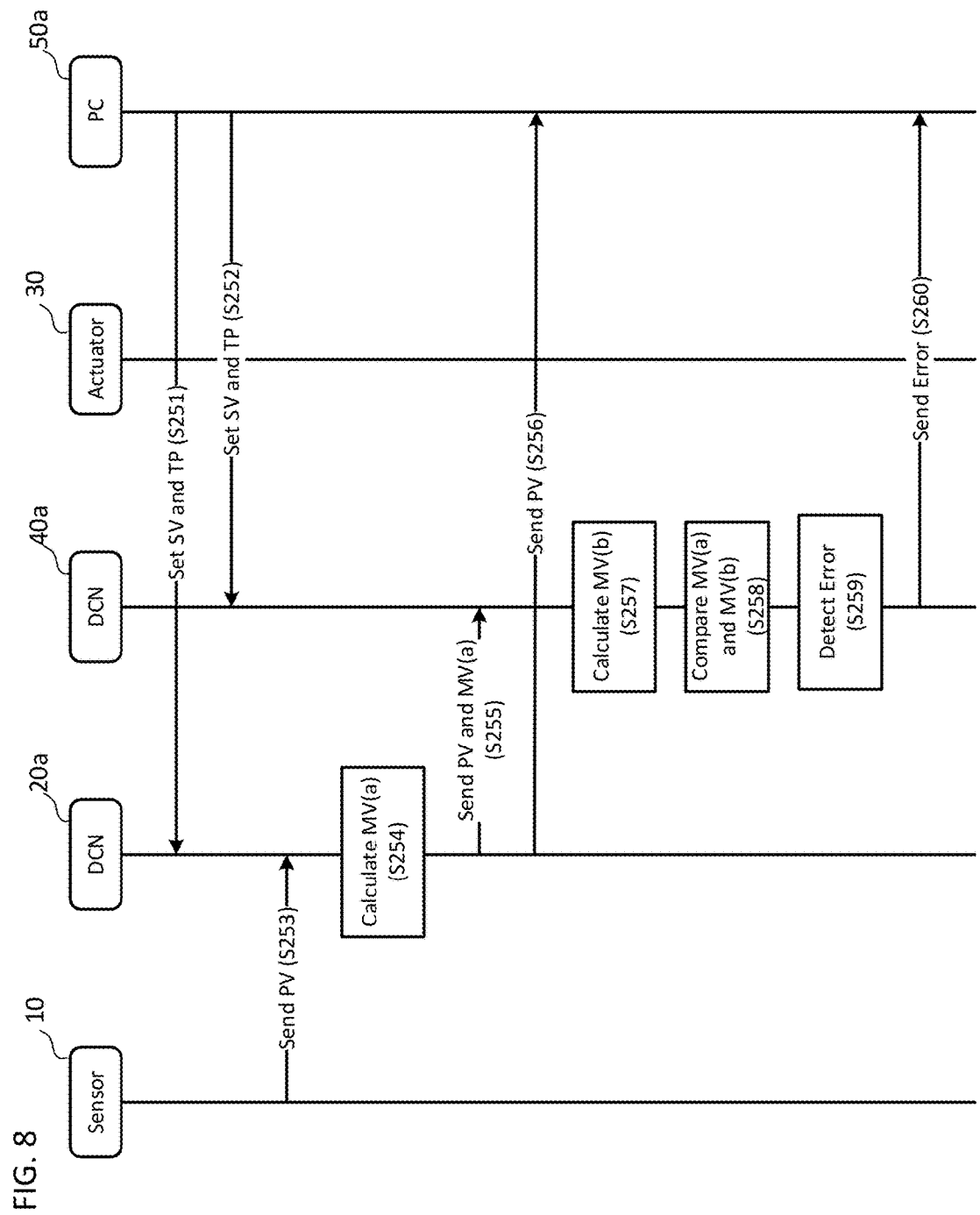

FIG. 8 shows a sequence diagram of operations performed by the management system 1*a* in accordance with one or more embodiments of the invention. FIG. 8 illustrates a scenario where the DCN 40*a* detects an error and avoids setting an abnormal value to the actuator 30.

Steps S251-S258 each correspond to S201-S208 shown in FIG. 7.

At S259, when the MV(a) calculated by DCN 20*a* and the MV(b) calculated by DCN 40*a* are not consistent (not identical), the MV comparator of the DCN 40*a* detects an error and refrains from setting either the MV(a) or the MV(b) to the actuator 30. Instead, the DCN 40*a* sends an error to the PC 50*a* (S260) to inform the operator of the PC 50*a* of the occurrence of an abnormality in the system.

Figure 9:
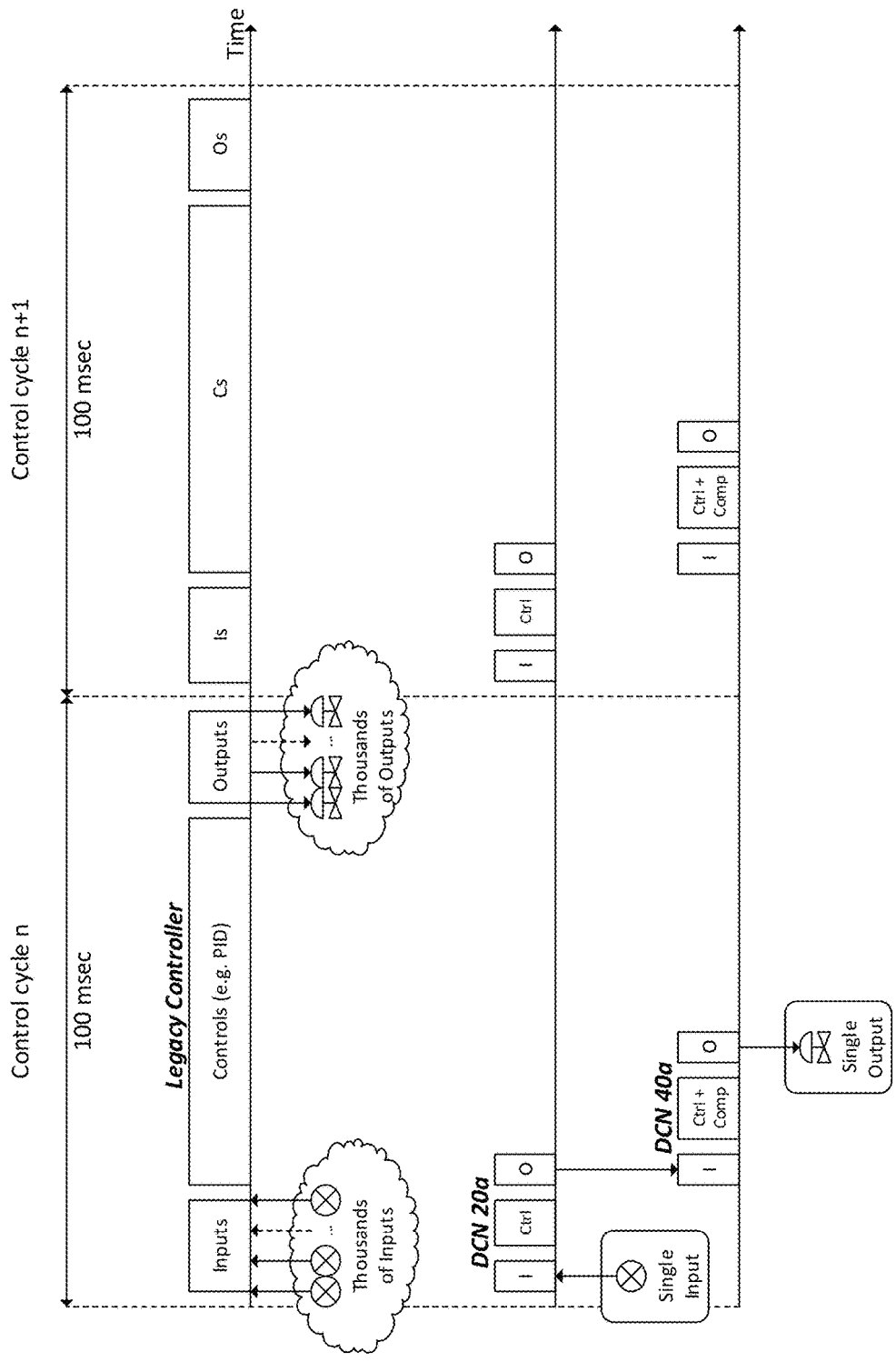
FIG. 9 shows a diagram for explaining an advantageous effect in one or more embodiments of the invention.

According to one or more embodiments of the invention, an abnormal value may be prevented from being set to the actuator 30 in the system using the DCNs that conform to the open architecture. Moreover, although the embodiments of the invention require the DCNs connected to input field devices to perform additional MV calculations, such computation time does not affect the performance of the entire system, as evidenced by FIG. 9.

A typical legacy controller used in a conventional management system handles over thousands of I/O devices and thus is required to consume approximately 30% of its computation power for handling the I/O operations. In other words, assuming that the control cycle is set to 100 milliseconds, 30 milliseconds are spent for the I/O operations. In one or more embodiments of the invention, each of the DCNs basically handles a single field device (e.g., a sensor and an actuator), which allows thousands of I/O and control operations to be performed in parallel. Thus, even if some of the DCNs need to perform the additional MV calculations required in the embodiments, each operation does not have negative impact on the entire control cycle.

Figure 10:
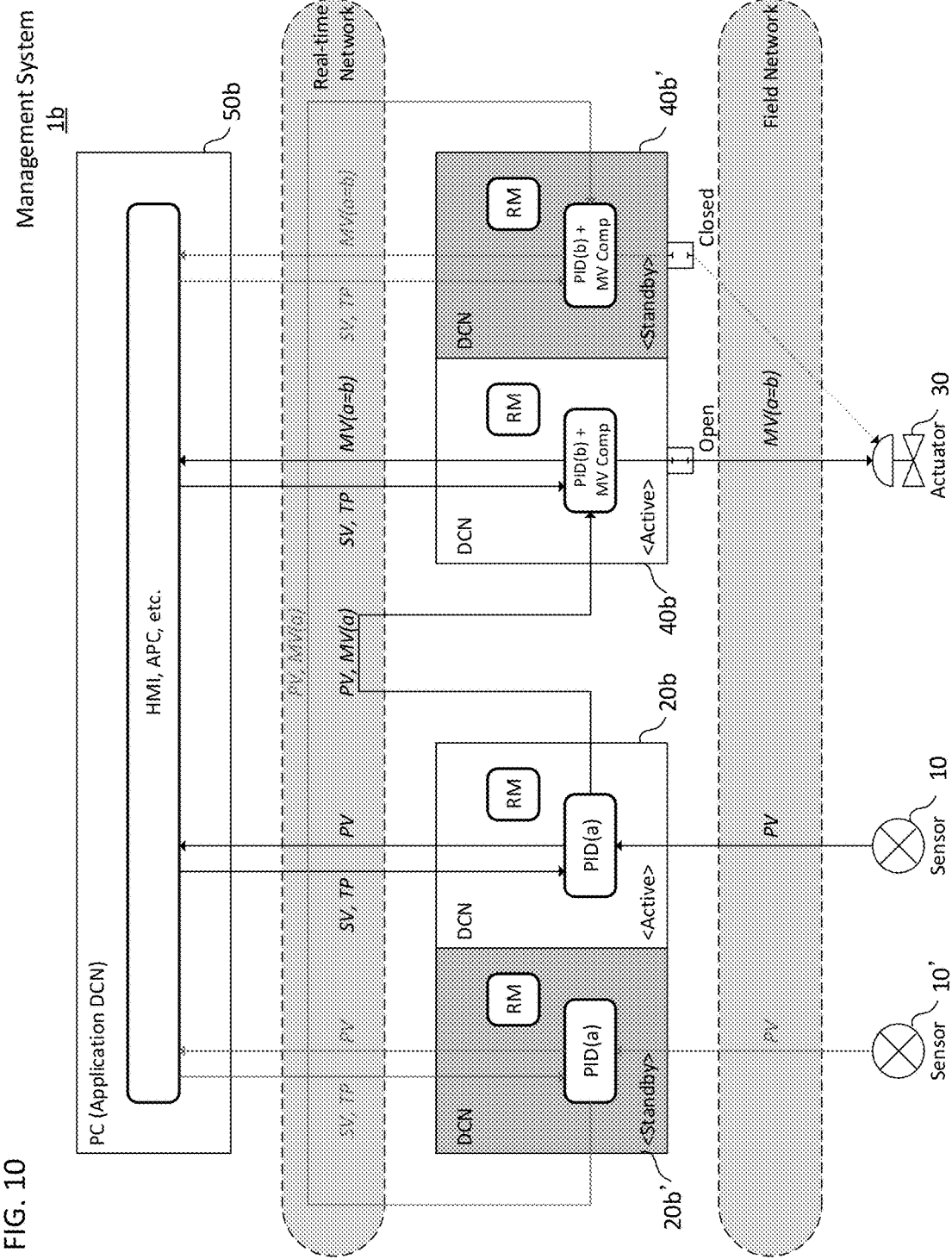
FIGS. 10-11 each show a block diagram of the management system in accordance with one or more embodiments of the invention.

FIG. 10 shows a block diagram of a management system 1*b* in accordance with one or more embodiments of the invention. In the management system 1*b*, a redundant sensor 10' is provided together with a sensor 10, and redundant DCNs 20*b*' and 40*b*' are provided with DCNs 20*b* and 40*b*. Similarly to the DCN 20*a* of the management system 1*a* discussed above, the DCNs 20*b* and 20*b*' may each calculate a MV(a) based on a PV obtained from the sensors 10 and 10'. Further, similarly to the DCN 40*a*, the DCNs 40*b* and 40*b*' may each calculate a MV(b) and compare it with the MV(a) to detect a calculation error in the system. Because the sensors 10 and 10' are closely arranged in the plant to measure substantially the same PV, the DCNs 40*b* and 40*b*' are expected to calculate the same MV. Each of the DCNs 20*b*, 20*b*', 40*b*, and 40*b*' is connected with the PC 50*b* by the real-time network.

In the management system 1*b*, each of the DCNs comprises a redundancy manager (RM) implemented by any of hardware (e.g., circuitry), software (e.g., application), and the combination thereof. Each RM controls the state of the DCN, i.e., "active," "standby," and "inactive." All of the DCNs except the inactive ones may perform the MV calculation. However, only the active DCNs may set the calculated MV to the actuator (e.g., DCN 40*b* in FIG. 10). To achieve this, each of the active DCN 40*b* and the standby DCN 40*b*' is connected to the actuator 30 via a gate, which is implemented by any of hardware (e.g., circuitry), software (e.g., application), and the combination thereof. Unless and until an error occurs in the MV calculation, only the gate of the DCN 40*b* is opened, and the DCN 40*b* exclusively sets the MV to the actuator 30. If the error occurs in the DCN 40*b*, the gate of the DCN 40*b* is closed and that of the DCN 40*b*' is opened, and thereby the DCN 40*b*' starts setting the MV to the actuator 30.

In one or more embodiments of the invention, instead of the gates, the DCNs 40*b* and 40*b*' may be both connected to the actuator 30 via a switch that may only forward the MV from the active DCN to the actuator 30. Any other equivalent device may be used to allow the MV from the active DCN to be forwarded to the actuator 30.

Figure 11:
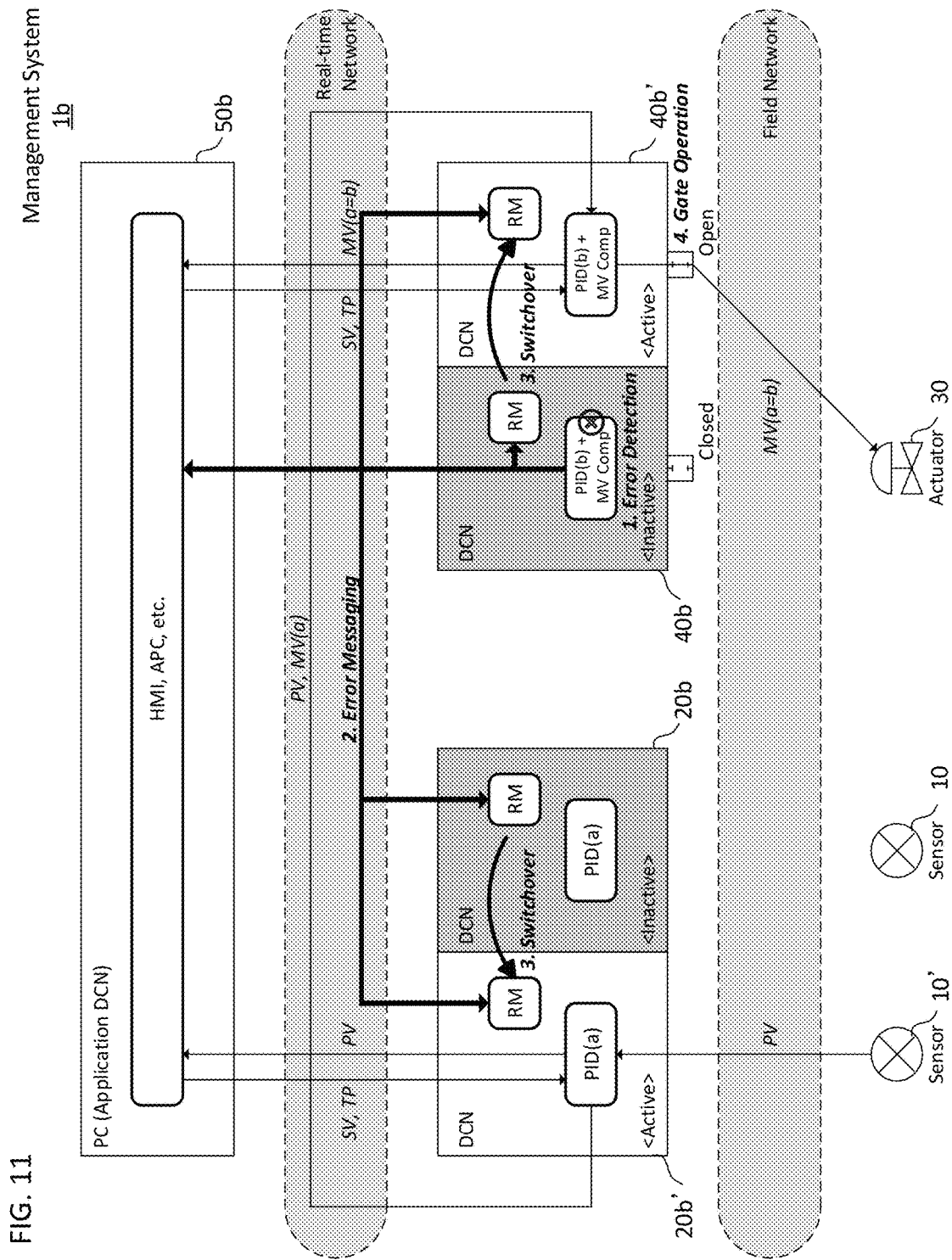

FIG. 11 illustrates status transition of the DCNs 20*b*, 20*b*', 40*b*, and 40*b*' in the management system 1*b* when an error is detected at the DCN 40*b*. Once the error occurs at the DCN 40*b* ("1. Error Detection"), the error is reported to each RM of the DCNs and PC 50*b* ("2. Error Messaging"). Next, the RMs of the DCNs 20*b* and 40*b* change their statuses to "inactive," and the RMs of the DCNs 20*b*' and 40*b*' change their statuses to "active" ("3. Switchover"). The DCN 40*b* then closes the gate, and the DCN 40*b*' opens the gate ("4. Gate Operation"). Finally, the DCNs 20*b*' and 40*b*' each take over the operations of the now-inactivated DCNs 20*b* and 40*b*, and starts setting the MV to the actuator 30. Once inactivated, the DCNs 20*b* and 40*b* may stop their operations.

Figure 12:
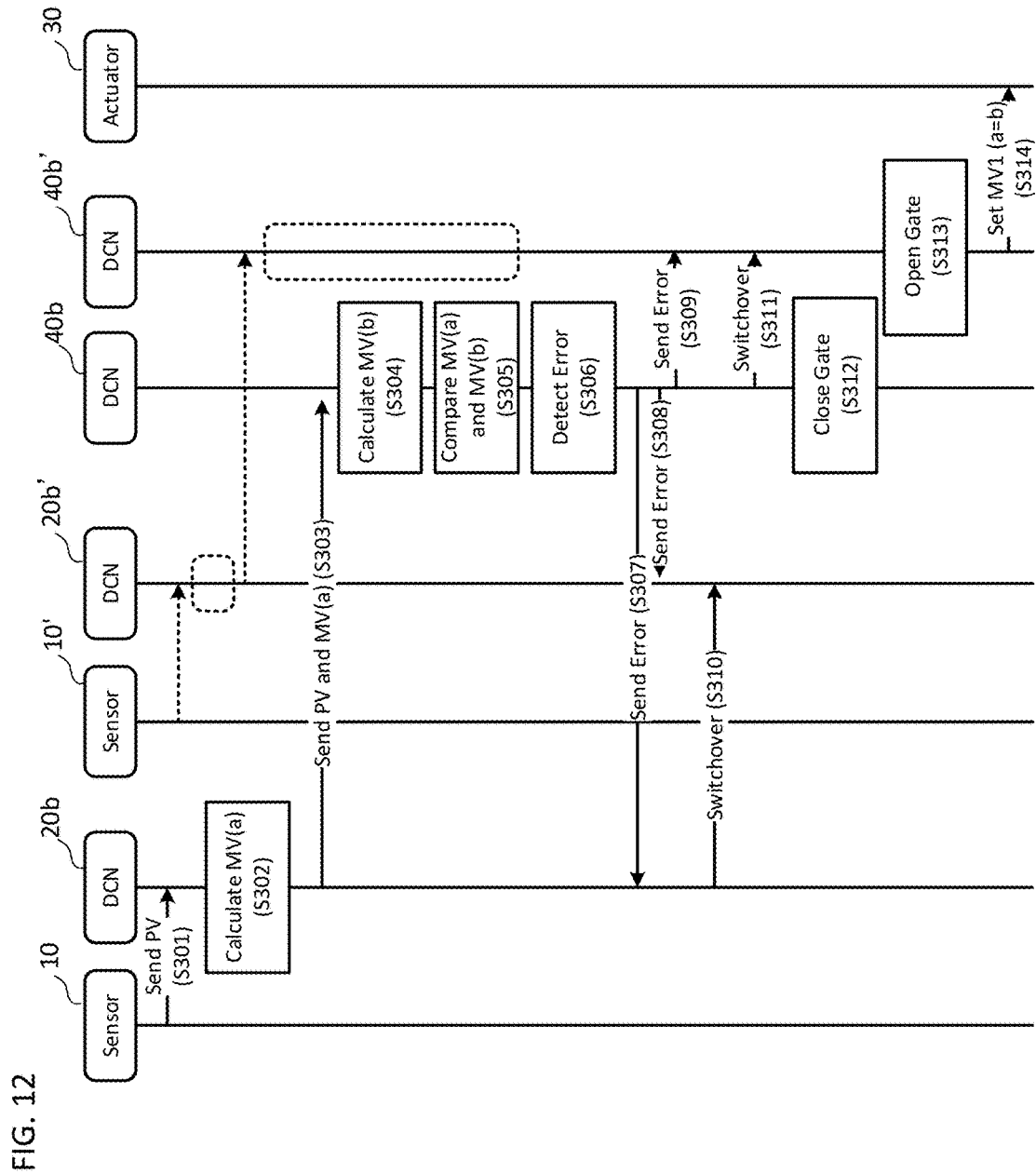
FIG. 12 shows a sequence diagram of operations performed by the management system in accordance with one or more embodiments of the invention.

FIG. 12 shows a sequence diagram of operations performed by the management system 1*b* in accordance with one or more embodiments of the invention. FIG. 12 illustrates a scenario where an error occurs in the active DCN 40*b* and the standby DCN 40*b*' then takes over the operation. Here, the interaction with the PC 50*b* is omitted from the diagram to focus on explaining the state transition operations by the RM.

Steps S301-S306 each correspond to S253-S255 and S257-S259 shown in FIG. 8.

When the DCN 40*b* detects an error (i.e., the MV(b) calculated by the DCN 40*b* and the MV(a) calculated by the DCN 20*b* are not identical), the comparator of the DCN 40*b* sends an error to each RM of the DCNs 20b, 20b', and 40b' (S307, S308, and S309). Each RM of the DCNs 20b and 20b' that has received the error performs the switchover operation, i.e., the RM of the DCN 20b changes its own status to "inactive" and the RM of the DCN 20b' changes its own status to "active" (S310). Similarly, each RM of the DCNs 40b and 40b' performs the switchover operation (S311). Subsequently, the DCN 40b closes the gate (S312), and the DCN 40b' opens the gate (S313). As a result, the DCN 40b' takes over the operation of the DCN 40b and starts setting the MV to the actuator 30 instead (S314).

According to one or more embodiments of the invention, once the DCN 40b detects an error in calculating the MV, the redundant DCN 40b' takes over the operation of the DCN 40b and thus the system may continue to work without maintenance. As a result, the reliability and the availability of the system are advantageously improved.

In one or more embodiments of the invention, the redundant (standby) DCNs 20b' and 40b' may be operating in the same manner as the active DCNs 20b and 40b are, except for setting the MV to the actuator 30, as indicated with the dashed lines in FIG. 12. This redundant configuration is called "Hot-standby." Alternatively, the redundant DCN 20b' and 40b' may start their operations only when and after the switchover occurs, which is called "Warm-standby." Any other redundancy scheme may be used for the switchover operation to activate the standby DCNs and deactivate the active DCNs.

In one or more embodiments of the invention, the RM may send the error to the PC 50b, although not shown in the FIG. 12. For example, the HMI of the PC 50b may inform the operator of the occurrence of the error and/or the switchover operation.

In one or more embodiments of the invention, the error transmissions at S307-S309 may be done by multicast transmission. In one or more embodiments of the invention, the switchover operations S310 and S311 may be performed in parallel. In one or more embodiments of the invention, the closing of the gate S312 and the opening of the gate S313 may be done in parallel. Moreover, each of the gating operations such as opening or closing of the gate may be performed by each DCN in parallel. After the completion of the switchover, all of the RMs may send a completion message to each other and to the PC 50b.

Figure 13:
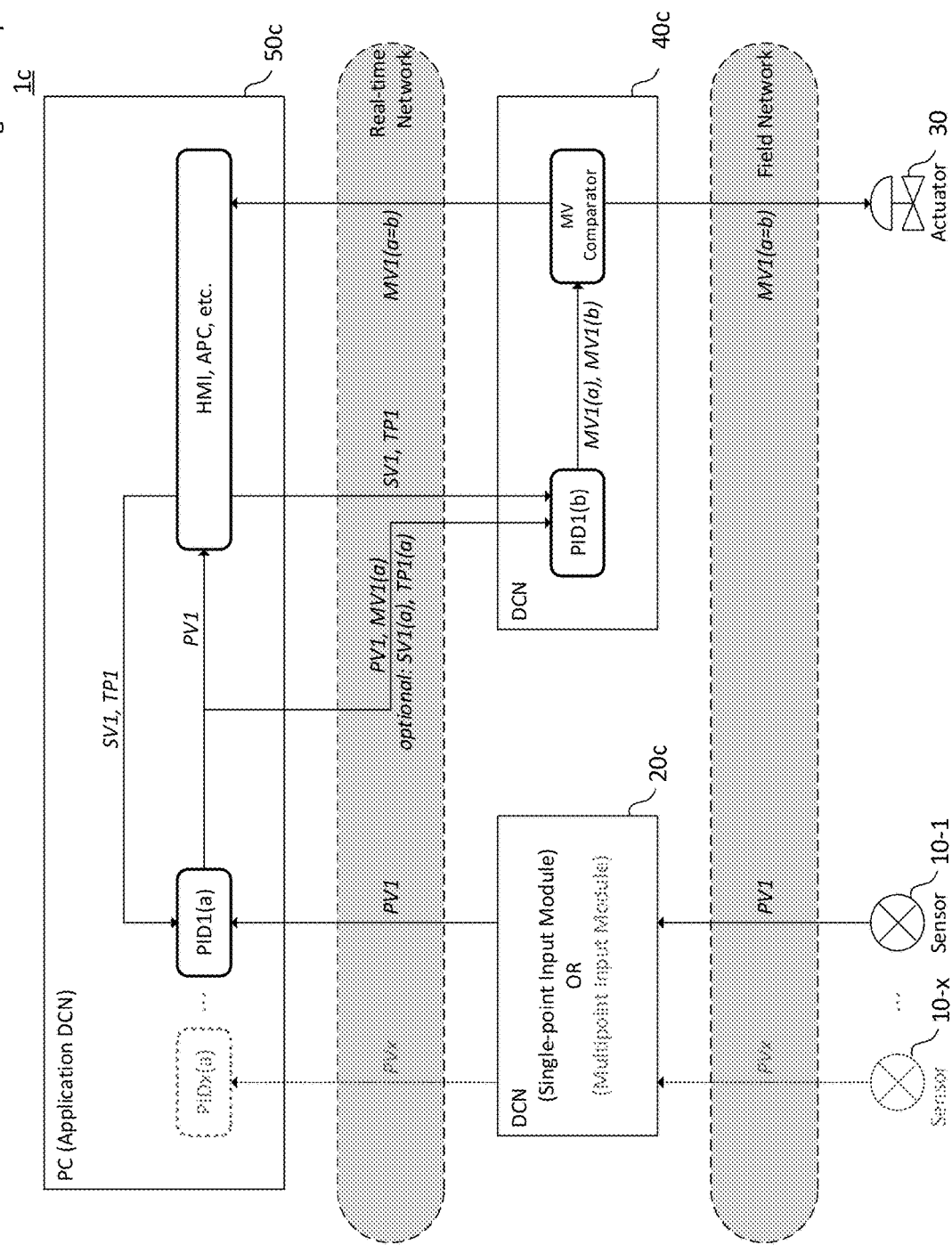
FIG. 13 shows a block diagram of the management system in accordance with one or more embodiments of the invention.

FIG. 13 shows a block diagram of a management system 1c in accordance with one or more embodiments of the invention. The management system 1c comprises a DCN 20c connected to one or more sensors 10-1 through 10-x. This means that the DCN 20c may receive one or more PVs from those sensors (PV1 through PVx). Additionally, the management system 1c comprises a PC 50c that runs one or more PID applications, each of which calculates an MV(a) (MV1(a) through MVx(a)) based on the PV (PV1 through PVx) received via the DCN 20c. To calculate the MV, the PC 50c sets parameters SV1 through SVx and TP1 through TPx to the PID applications, respectively.

The PC 50c, which has calculated the MV1(a) through MVx(a), transmits the MV(a) and PV (and optionally SV and TP) to each of DCNs connected to an actuator. In the example of FIG. 13, only the representative DCN 40c is shown, which calculates the MV1(b) based on the PV1 and the parameters SV1 and TP1 configured by the PC 50c in advance. Subsequently, similarly to the DCN 40a shown in FIG. 5 or the DCN 40b shown in FIG. 10, the DCN 40c compares the calculated MV1(b) with the received MV1(a), and if both are identical, then the DCN 40c sets the MV1(a) (or MV1(b)) to the actuator 30. Otherwise, the DCN 40c sends an error to the PC 50c.

Figure 14:
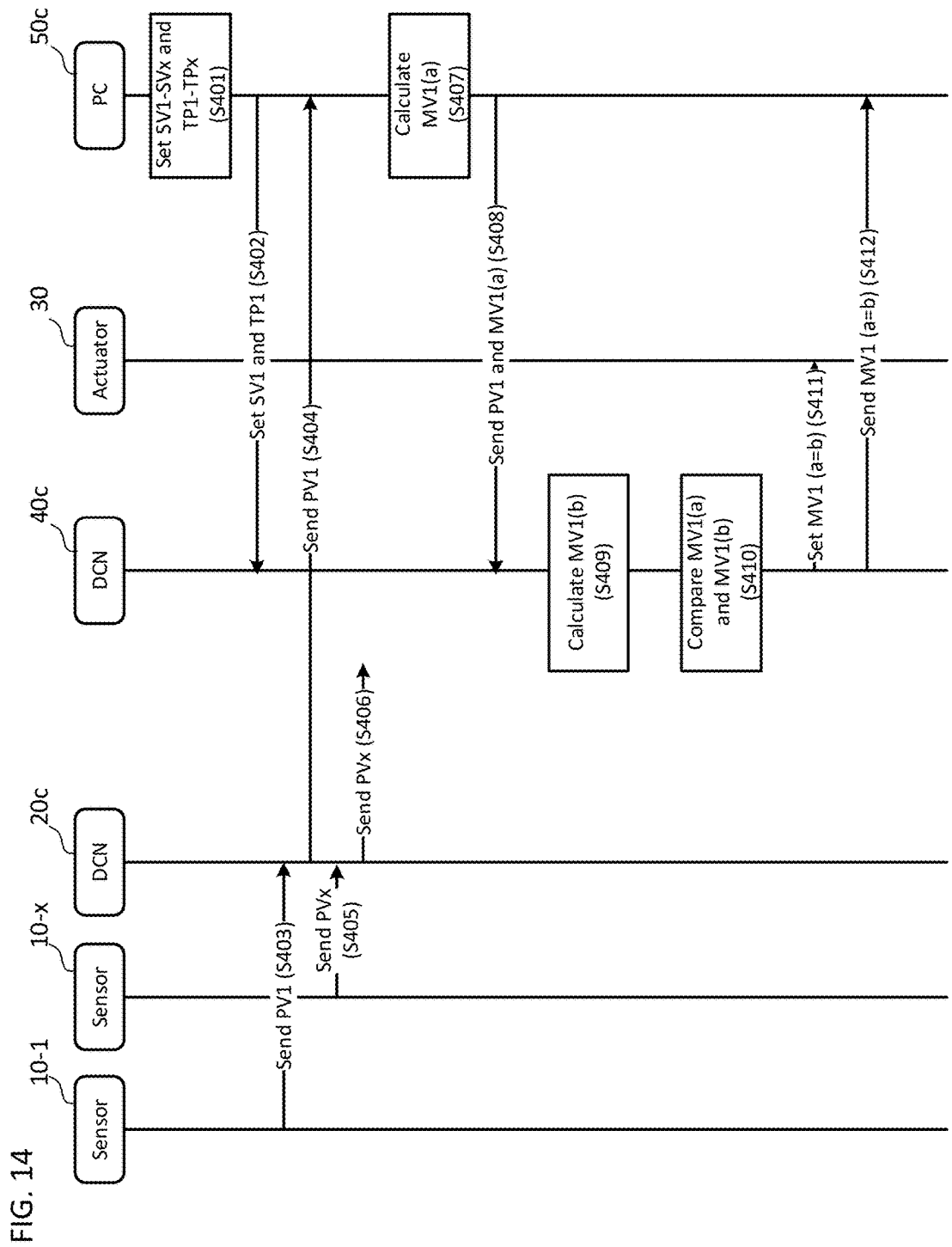
FIGS. 14-15 each show a sequence diagram of operations performed by the management system in accordance with one or more embodiments of the invention.

FIG. 14 shows a sequence diagram of operations performed by the management system 1c in accordance with one or more embodiments of the invention. FIG. 14 illustrates a scenario where the DCN 40c correctly sets the calculated MV to the actuator 30. In this example, only the two sensors 10-1, 10-x connected to the DCN 20c and a single pair of the DCN 40c and the actuator 30 are shown for purposes of explanation.

First, the PC 50c sets the SV1 through SVx and TP1 through TPx to the PID applications running on the PC 50c (S401). Next, the PC 50c sets the SV1 and the TP1 to the DCN 40c (S402). Although not shown in FIG. 14, the PC 50c may set the remaining parameters to other DCNs each connected to the other actuator.

After the parameters have been set, the DCN 20c obtains or receives the PV1 from the sensor 10-1 (S403) and sends it to the PC 50c (S404). Subsequently (or at the same time), the DCN 20c obtains or receives the PVx from the sensor 10-x (S405) and sends it to the PC 50c (S406). In this example, the PVx has not yet reached the PC 50c.

Upon receiving the PV1, the PC 50c calculates the MV1(a) based on the received PV1 and the configured SV1 and TP1 (S407), and sends the calculated MV1(a) to the DCN 40c together with the PV1 (S408). Subsequent steps S409-S412 are similar to S207-S210 of FIG. 7.

Figure 15:
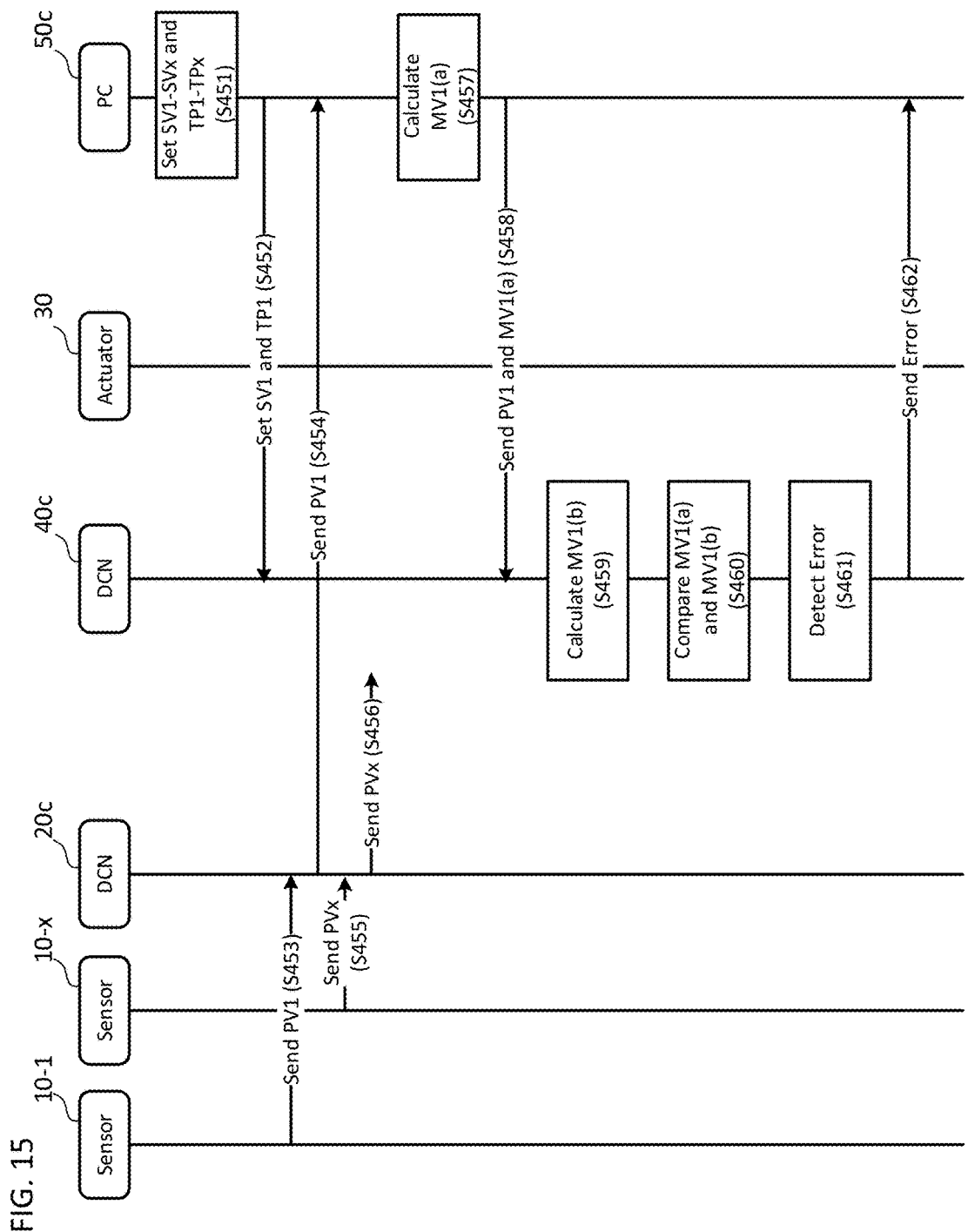

FIG. 15 shows a sequence diagram of operations performed by the management system 1c in accordance with one or more embodiments of the invention. FIG. 15 illustrates a scenario where the DCN 40c detects an error in the MV calculation and avoids setting an abnormal value to the actuator 30.

Steps S451-S458 each correspond to S401-S408 shown in FIG. 14. Moreover, subsequent steps S459-S462 are similar to S257-S260 of FIG. 8.

According to one or more embodiments of the invention, the DCN 20c connected to the input field devices requires less computing power because the MV calculation is not performed thereon. Thus, an existing single input module or multiple input modules may be used as the DCN 20c, and thereby the initial and maintenance cost for the entire system may be significantly reduced.

In one or more embodiments of the invention, the DCN 20c may be a multiple input module or a multiple input DCN, which may accept input signals from 32 or more field devices. In one or more embodiments of the invention, the PC 50c may be a controller having a function equivalent to a general purpose computer. Alternatively, the PC 50c may be a distributed computer system including one or more computers connected with each other via a network.

Figure 16:
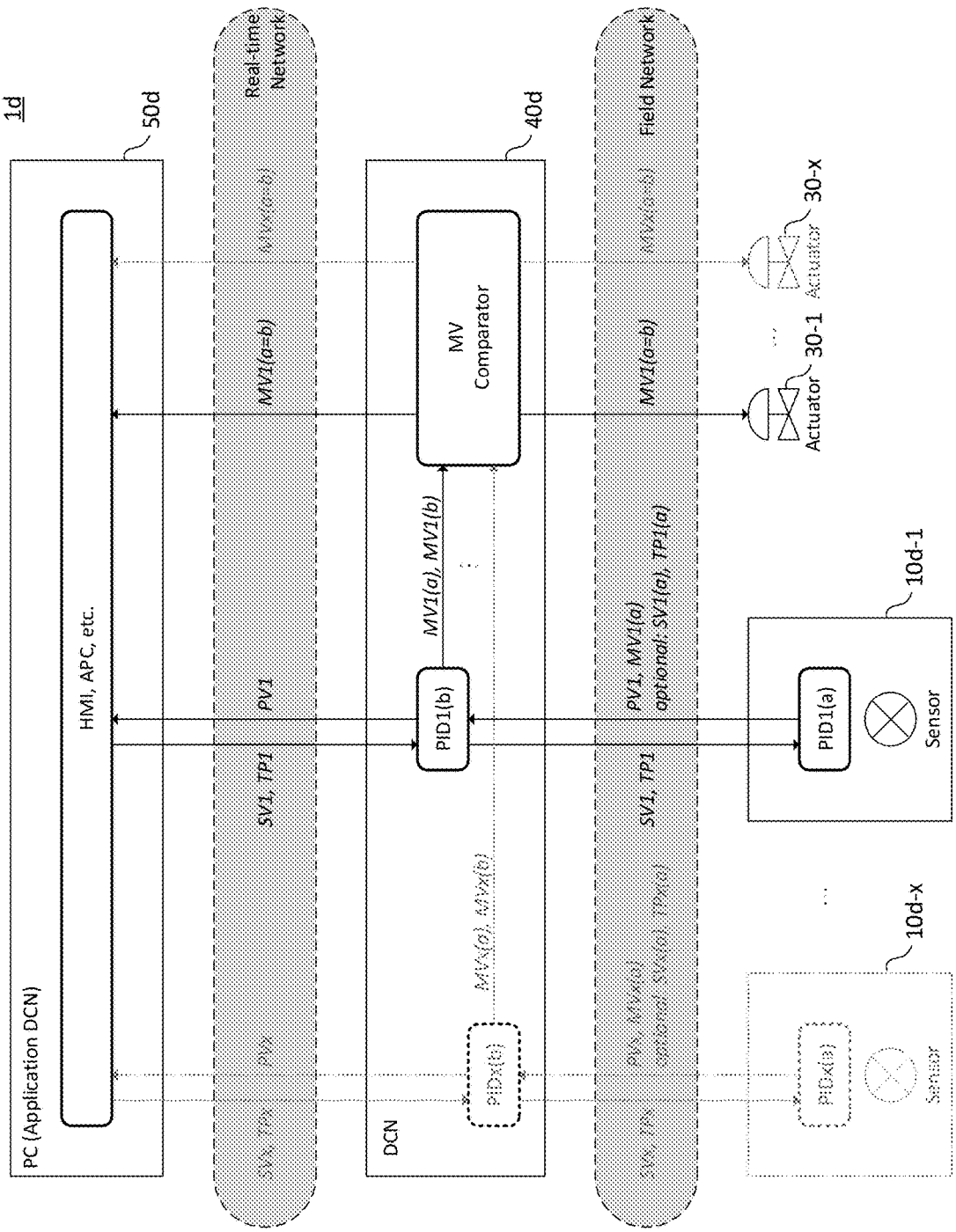
FIG. 16 shows a block diagram of the management system in accordance with one or more embodiments of the invention.

FIG. 16 shows a block diagram of a management system 1d in accordance with one or more embodiments of the invention. The management system 1d comprises one or more sensors 10d-1 through 10d-x, each of which is capable of running a PID application and calculating a MV(a) based on a measured PV. The management system 1d also comprises a PC 50d, which may set parameters SV and TP to each of the sensors 10d-1 through 10d-x via a DCN 40d (SV1 through SVx and TP1 through TPx). Moreover, the management system 1d comprises one or more actuators 30-1 through 30-x controlled based on the PV from the sensors 10d-1 through 10d-x, respectively. The sensors 10d-1 through 10d-x and the actuators 30-1 through 30-x are connected via the DCN 40d.

In the management system 1d, each of the sensors 10d-1 through 10d-x transmits to the DCN 40d the calculated MV(a) (MV1(a) through MVx(a)) and the measured PV (PV1 through PVx) (and optionally the parameters SV1(a) through SVx(a) and TP1(a) through TPx(a)). The DCN 40*d* then calculates the MV(b) (MV1(b) through MVx(b) each corresponding to MV1(a) through MVx(a)) and compares it with the received MV(a) (each of MV1(a) through MVx(a)). When the MV(b) calculated by the DCN 40*d* and the MV(a) received from the sensor 10*d* are identical, the DCN 40*d* sets the MV(a) (or MV(b)) to the corresponding actuator 30. On the contrary, if the MV(b) and the MV(a) are not identical, the DCN 40*d* sends an error to the PC 50*d*.

Figure 17:
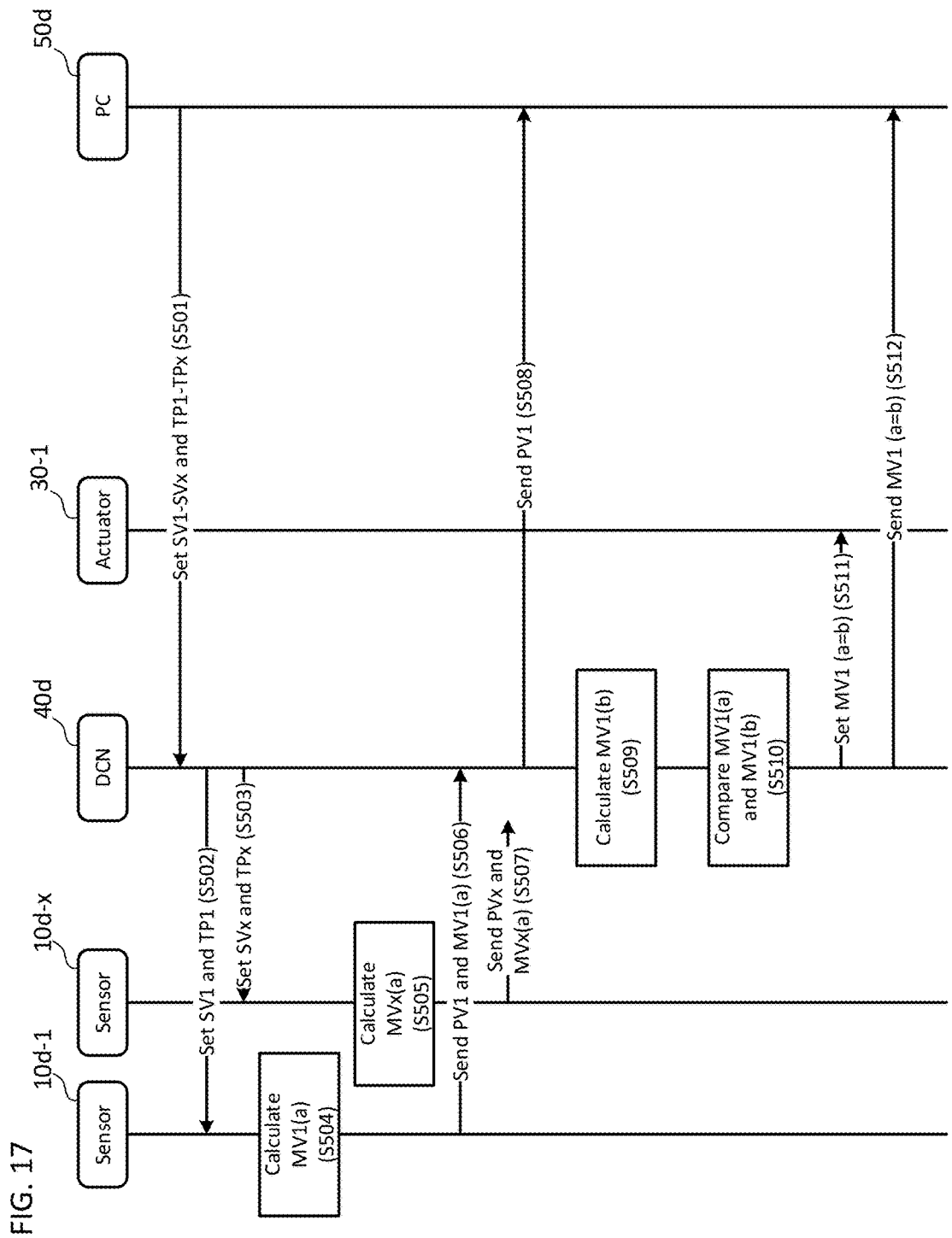
FIGS. 17-18 each show a sequence diagram of operations performed by the management system in accordance with one or more embodiments of the invention.

FIG. 17 shows a sequence diagram of operations performed by the management system 1*d* in accordance with one or more embodiments of the invention. FIG. 17 illustrates a scenario where the DCN 40*d* correctly sets the MV to the actuator 30-1. In this example, the sensors and the actuators other than the sensors 10*d*-1, 10*d*-*x* and the actuator 30-1 are omitted for the purpose of simple explanation.

First, the PC 50*d* sets the SV1 through SVx and TP1 through TPx to the DCN 40*d* (S501). The DCN 40*d* then sets the pair of the SV and TP to each of the sensors 10*d*-1, 10*d*-*x* (S502, S503). Once the parameters are set, the sensors 10*d*-1, 10*d*-*x* each measure the PV1 and PVx and calculate the MV1(a) and MVx(a) (S504, S505). The sensors 10*d*-1, 10*d*-*x* transmit to the DCN 40*d* the calculated MV1(a) and MVx(a) together with the PV1 and the PVx, respectively (S506, S507).

In a case where the DCN 40*d* has received the PV1 and MV1(a) from the sensor 10*d*-1, the DCN 40*d* transmits the PV1 to the PC 50*d* (S508). Subsequent steps S509-S512 are similar to S207-S210 of FIG. 7.

Figure 18:
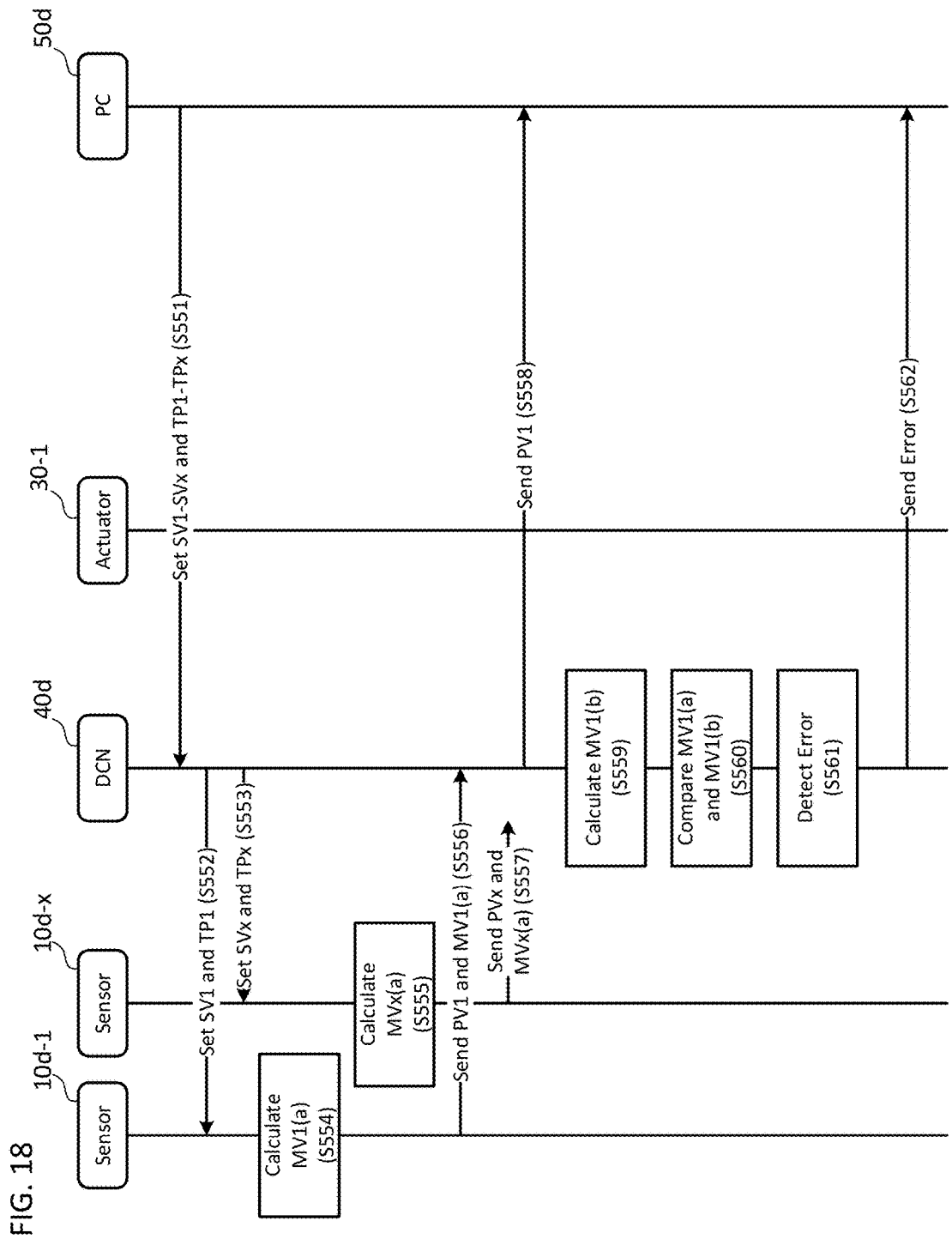

FIG. 18 shows a sequence diagram of operations performed by the management system 1*d* in accordance with one or more embodiments of the invention. FIG. 18 illustrates a scenario where one of the DCN 40*d* detects an error in the MV calculation and avoids setting an abnormal value to the actuator 30-1.

Steps S551-S558 each correspond to S451-S458 shown in FIG. 17. Moreover, subsequent steps S559-S562 are similar to S257-S260 of FIG. 8.

According to one or more embodiments of the invention, all of the operations (i.e., parameter setting, PV measurement, and MV calculation and comparison) may be completed within the control loop of the DCN 40*d*. For example, once the DCN 40*d* detects an error in the MV calculation, it may stop only the operation of the sensor and actuator related to that erroneous calculation. Thus, the DCN 40*d* does not need to stop its operation in order for excluding the potentially defective sensors, and it should stop only the control loops which may have errors. In other words, the DCN 40*d* allows for autonomous operation of a part of the system.

Additionally, because several actuators and sensors are controlled by the single DCN 40*d*, the total number of the DCNs in the entire system may be decreased, which makes it easier for the operator to maintain and extend the entire system.

In one or more embodiments of the invention, each of the sensors 10*d*-1 through 10*d*-*x* may be an intelligent sensor that operates under the standard of HART or FF. In one or more embodiments of the invention, the DCN 40*d* may be a multiple input/output DCN, which may accept input signals from 16 or more field devices and generate output signals to 16 or more field devices.

Figure 19:
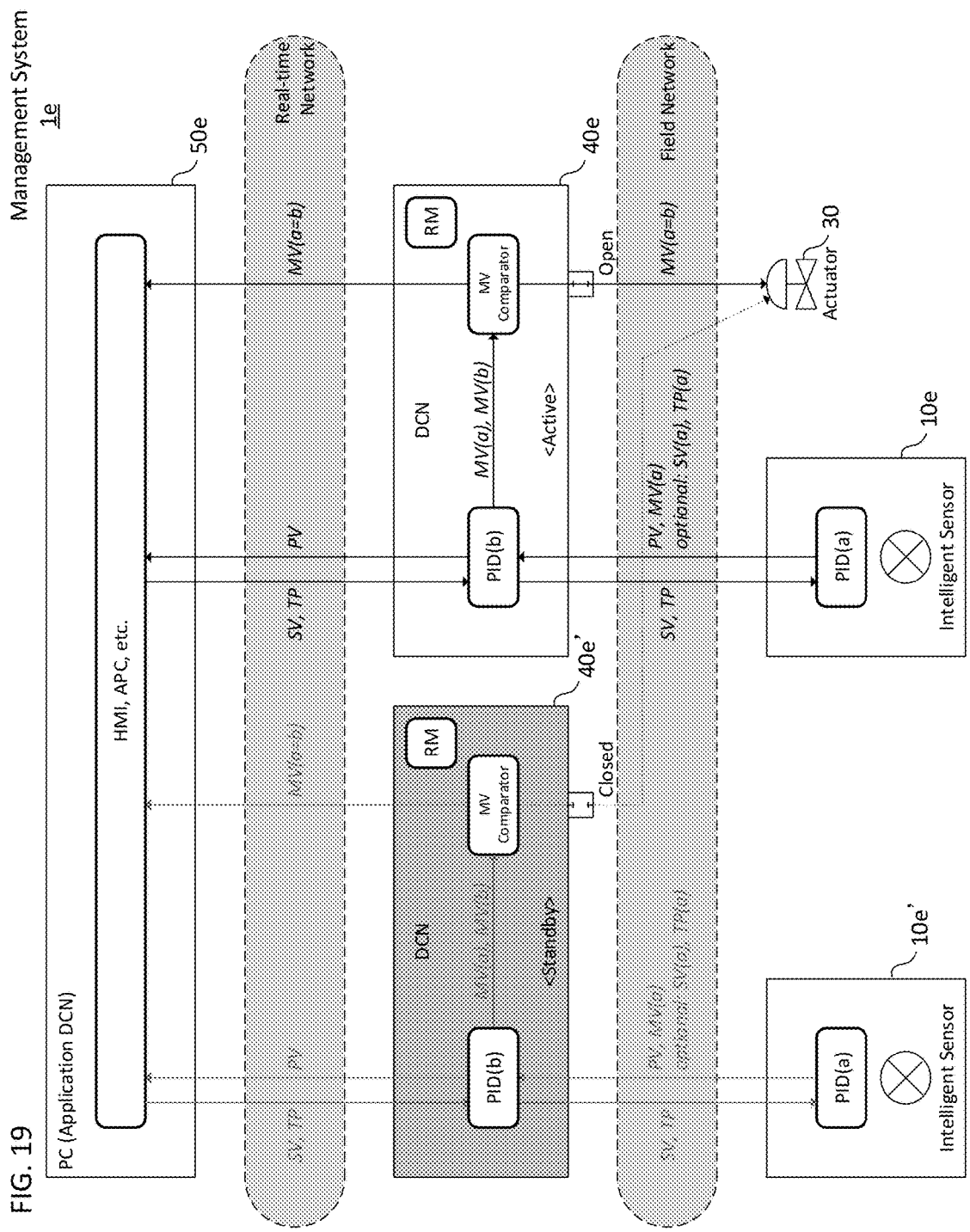
FIGS. 19-20 each show a block diagram of the management system in accordance with one or more embodiments of the invention.

FIG. 19 shows a block diagram of a management system 1*e* in accordance with one or more embodiments of the invention. The management system 1*e* comprises a sensor 10*e* that has a similar function as the sensor 10*d*-1 shown in FIG. 16. The sensor 10*e* and an actuator 30 are connected via a DCN 40*e* that has a similar function as the DCN 40*d* shown in FIG. 16. Additionally, the management system 1*e* comprises a redundant set of the sensor 10*e* and the DCN 40*e*, i.e., a redundant sensor 10*e*' and a redundant DCN 40*e*', like the management system 1*b* shown in FIG. 10.

In the example of FIG. 19, the DCN 40*e* obtains a MV(a) calculated by the sensor 10*e* and compares the MV(a) with a MV(b) calculated by the DCN 40*e* to determine whether an error occurs in the MV calculation. Once the error occurs, similarly to the management system 1*b* of FIG. 10, the redundant sensor 10*e*' and the redundant DCN 40*e*' take over each of the operations of the sensor 10*e* and the DCN 40*e*. The status of each of DCN 40*e*, 40*e*' is managed by an RM as discussed above.

Figure 20:
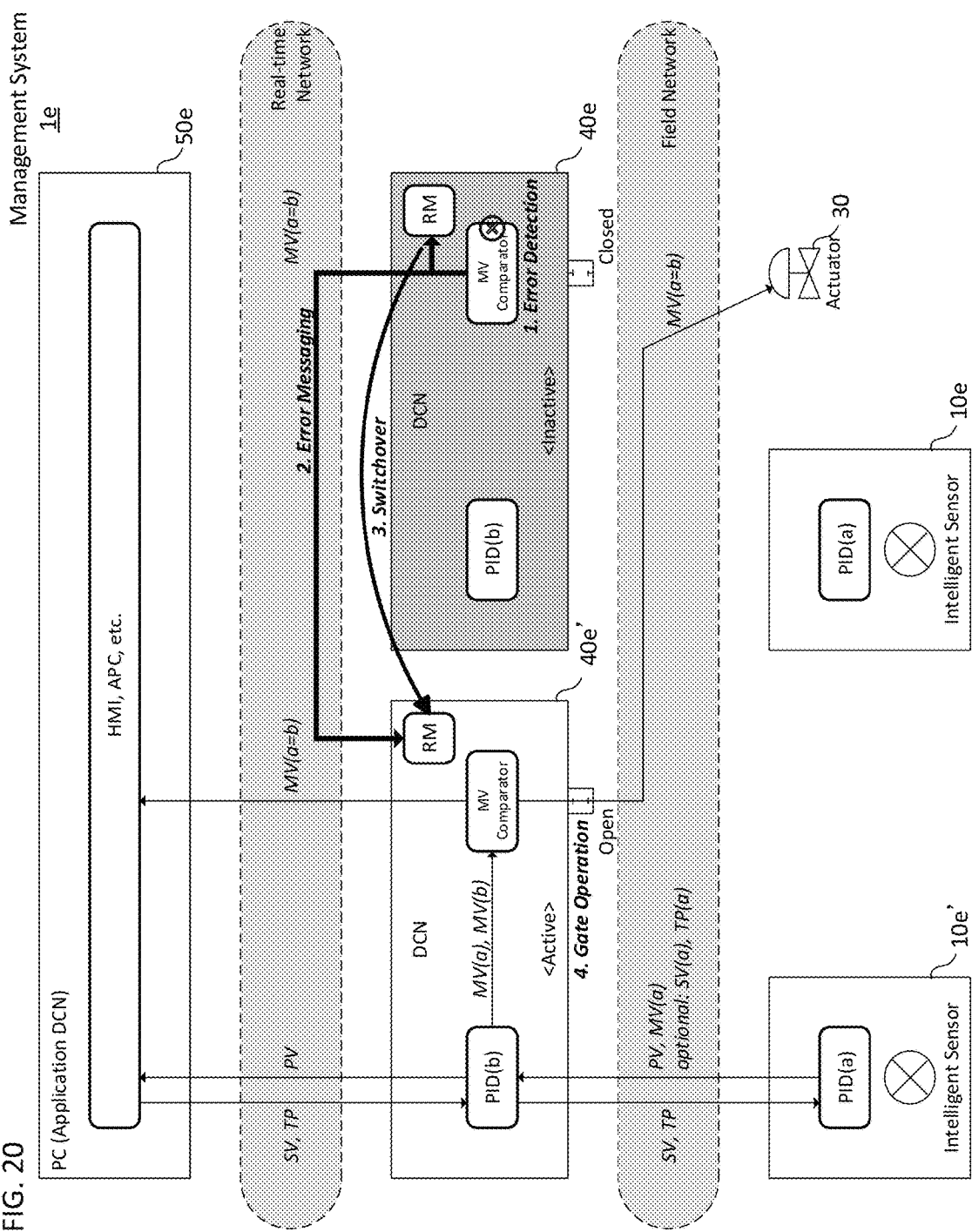

FIG. 20 illustrates status transition of the DCN 40*e* and the DCN 40*e*' in the management system 1*e* when a calculation error occurs at the DCN 40*e*. Once the error occurs at the DCN 40*e* ("1. Error Detection"), the error is reported to each RM of the DCN 40*e* and the DCN 40*e*' ("2. Error Messaging"). Next, the RM of the DCN 40*e* changes its status to "inactive," and the RM of the DCN 40*e*' changes its status to "active" ("3. Switchover"). The DCN 40*e* then closes the gate, and the DCN 40*e*' opens the gate ("4. Gate Operation"). Finally, the DCN 40*e*' takes over the operations of the inactivated DCN 40*e* and starts setting the MV to the actuator 30.

Figure 21:
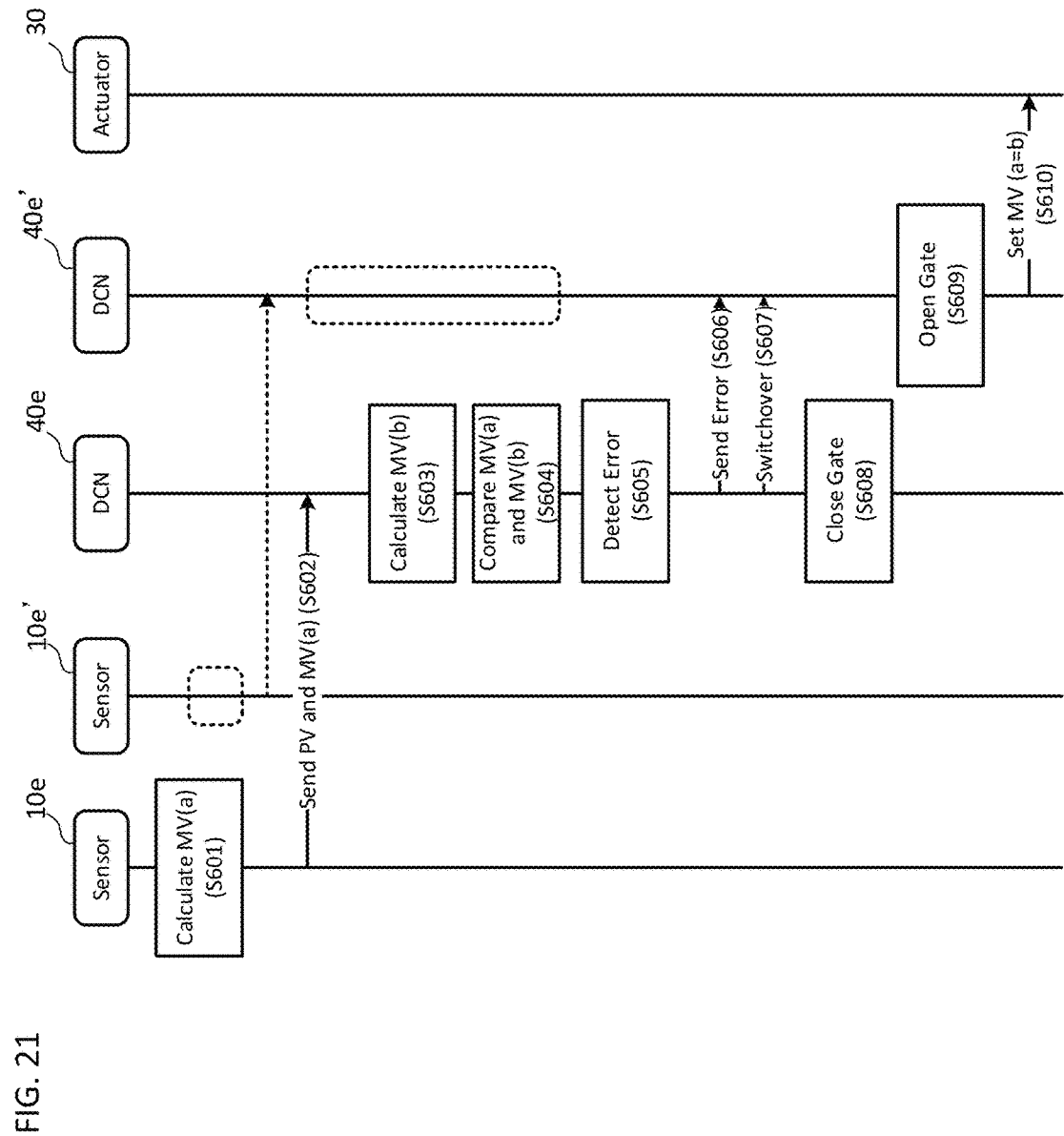
FIG. 21 shows a sequence diagram of operations performed by the management system in accordance with one or more embodiments of the invention.

FIG. 21 shows a sequence diagram of operations performed by the management system 1*e* in accordance with one or more embodiments of the invention. FIG. 21 illustrates a scenario where an error occurs in the active DCN 40*e* and the standby DCN 40*e*' then takes over its operation. Here, the interaction with the PC 50*e* is omitted from the diagram to focus on explaining the state transition by the RM.

Steps S601-S605 each correspond to S554, S556, and S559-S561 shown in FIG. 18.

When the DCN 40*e* detects an error (i.e., the MV(b) calculated by the DCN 40*e* and the MV(a) calculated by the sensor 10*e* are not identical), the MV comparator of the DCN 40*e* sends an error to each RM of the DCN 40*e* and the DCN 40*e*' (S606). Subsequently, each RM of the DCN 40*e* and the DCN 40*e*' performs the switchover (S607), i.e., the RM of the DCN 40*e* changes its own status to "inactive" and the RM of the DCN 20*e*' changes its own status to "active." The DCN 40*e* then closes the gate (S608) and the DCN 40*e*' opens the gate (S609). As a result, the DCN 40*e*' takes over the operation of the DCN 40*e* to set the MV to the actuator 30 (S610).

According to one or more embodiments of the invention, once the DCN 40*e* detects an error in calculating the MV, the redundant DCN 40*e*' may take over the operation of the DCN 40*e*. As a result, the system may continue its operation without replacing the inactivated DCN 40*e*.

In one or more embodiments of the invention, the redundant (standby) DCN 40*e*' may be operating in the same manner as the active DCN 40*e* is, except for the MV setting for the actuator 30, as indicated with the dashed lines in FIG. 21 (Hot-standby). Alternatively, the redundant DCN 40*e*' may start its operations only when the switchover is triggered (Warm-standby). Any other redundancy scheme may be used to switch the operation from the DCN 40*e* to the DCN 40*e*'.

In one or more embodiments of the invention, the DCN 40*e* may send the error to the PC 50*e*, although the PC 50*e* is not shown in the FIG. 21. For example, the HMI of the PC 50e may inform the operator of the occurrence of the error at the DCN 40e.

In one or more embodiments of the invention, the closing of the gate S608 and the opening of the gate S609 may be done at the same time. After the completion of the switchover, all of the RMs may send a completion message to each other and to the PC 50e.

Figure 22:
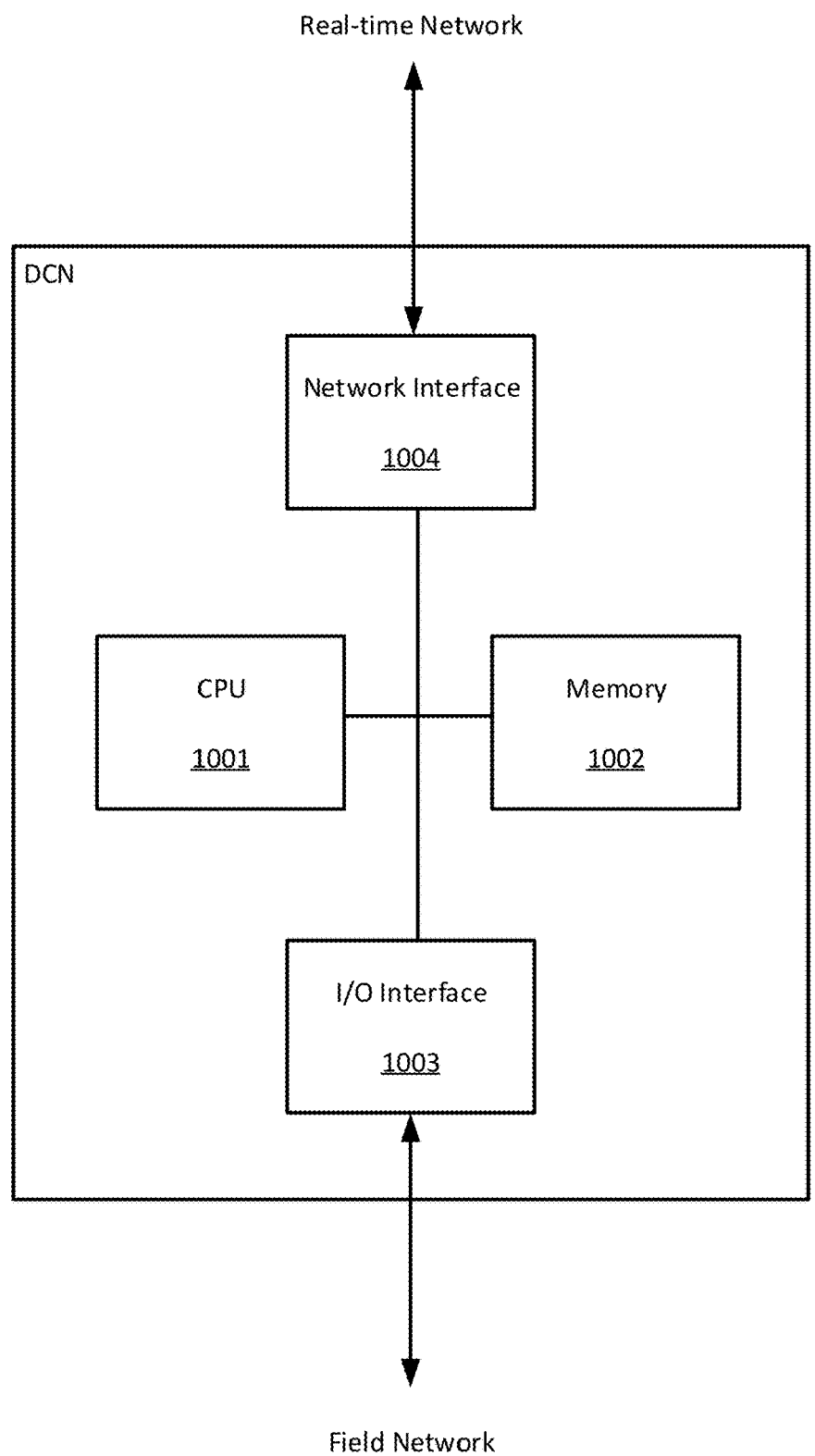
FIG. 22 shows an implementation example of the DCN in accordance with one or more embodiments of the invention.

FIG. 22 shows an implementation example of the DCN in accordance with one or more embodiments of the invention.

In one or more embodiments of the invention, the DCN may comprise a CPU 1001, a memory 1002 associated with the CPU 1001, an I/O interface 1003 that communicates with the field devices via the field network, and a network interface 1004 that communicates with the PC via the real-time network. Two or more of those components 1001-1004 may be integrated into a single circuit. The DCN may comprise any other hardware components not shown in FIG. 22. As discussed above, the DCN may also comprise a circuit for the comparator and the gate.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A management system for a plant facility, comprising:
    a first field device that measures a process value;
    a second field device that controls a control object;
    an application node that configures one or more parameters for calculating a first control value that the second field device uses to control the control object; and
    a first control node that calculates the first control value based on the process value and the parameters;
    wherein
    the first control node compares the first control value with a second control value calculated based on the process value and the parameters by one of the first field device, the first control node, a second control node, and the application node,
    when determining that the first and the second control values are identical, the first control node sets the first control value to the second field device, and
    when determining that the first and the second control values are not identical, the first control node sends an error to the application node without setting the first control value to the second field device.

2. The management system according to claim 1, wherein the first control node comprises a processor with two processor cores, and
    the two processor cores calculate the first and the second control value, respectively, and
    the processor determines whether the first and the second control values are identical.

3. The management system according to claim 1, further comprising
    the second control node that:
        obtains the process value from the first field device; and
        calculates the second control value based on the obtained process value and the parameters received from the application node, wherein
    the first control node compares the first control value calculated by the first control node with the second control value calculated by the second control node.

4. The management system according to claim 3, wherein the first control node comprises a comparator, and
    the comparator compares the first and the second control values.

5. The management system according to claim 3, wherein the second control node sends the received parameters to the first control node together with the obtained process value and the calculated second control value.

6. The management system according to claim 3, further comprising:
    a first and a second redundant control nodes provided for the first and the second control node, respectively; and
    a redundant field device provided for the first field device, wherein
    when the first control node determines that the first and the second control values are not identical, the first redundant control node sets a third control value to the second field device, the third control value being calculated based on the process value obtained from the redundant field device and the parameters.

7. The management system according to claim 6, wherein once the first control node determines that the first and the second control values are not identical, the first and the second redundant control node take over operations of the first and the second control node, respectively.

8. The management system according to claim 7, wherein the taking over of the operations is managed by a redundancy manager that operates in each of the first and the second control node and the first and the second redundant control node.

9. The management system according to claim 6, wherein the first control node and the first redundant control node each comprise a gate; and
    once the first control node determines that the first and the second control values are not identical, the gate of the first control node is closed and the gate of the first redundant control node is opened.

10. The management system according to claim 1, further comprising
    the second control node that obtains the process value from the first field device, wherein
    the application node:
        receives the process value via the second control node; and
        calculates the second control value based on the received process value and the parameters, and
    the first control node compares the first control value calculated by the first control node with the second control value calculated by the application node.

11. The management system according to claim 10, wherein
    the second control node is a multipoint input module.

12. The management system according to claim 1, wherein
    the first and the second field device are connected to the first control node,
    the first field device calculates the second control value based on the measured process value and the parameters received from the application node, and
    the first control node compares the first control value calculated by the first control node with the second control value calculated by the first field device.

13. The management system according to claim 12, wherein
    the first control node is a multipoint DCN.

14. The management system according to claim 1, further comprising:

a redundant control node provided for the first control node; and
a redundant field device provided for the first field device, wherein
the first and the second field device are connected to the first control node,
the redundant and the second field device are connected to the redundant control node,
the first field device calculates the second control value based on the measured process value and the parameters received from the application node,
the first control node compares the first control value calculated by the first control node with the second control value calculated by the first field device, wherein
when the first control node determines that the first and the second control values are not identical, the redundant control node sets a third control value to the second field device, the third control value being calculated based on the process value obtained from the redundant field device and the parameters received from the application node.

15. The management system according to claim 14, wherein
both of the first and the redundant control node are multipoint DCNs.

16. The management system according to claim 1, wherein
at least one of the first and the second field device is connected to the first control node by a field network.

17. The management system according to claim 1, wherein
the application node is connected to the first control node by a real-time network.

18. The management system according to claim 1, wherein
the application node receives from the first control node the first control value set to the second field device.

19. The management system according to claim 1, wherein
the application node is a general-purpose computer.

20. A method for managing a plant facility, comprising:
measuring a process value in a first field device;
configuring, by an application node, one or more parameters for calculating a first control value that a second field device uses to control a control object;
in a first control node, calculating the first control value based on the measured process value and the parameters;
in one of the first field device, the first control node, a second control node, and the application node, calculating a second control value based on the measured process value and the parameters;
in the first control node, comparing the first control value with the second control value;
in the first control node, when the first and the second control values are identical, setting the first control value to the second field device, and
in the first control node, when the first and the second control values are not identical, sending an error to the application node without setting the first control value to the second field device.

\* \* \* \* \*